United States Patent
Sameshima

(10) Patent No.: US 6,856,754 B2
(45) Date of Patent: Feb. 15, 2005

(54) CONTENT RECORDING/ERASING APPARATUS

(75) Inventor: Tetsuro Sameshima, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 45 days.

(21) Appl. No.: 10/602,410

(22) Filed: Jun. 23, 2003

(65) Prior Publication Data

US 2004/0005139 A1 Jan. 8, 2004

(30) Foreign Application Priority Data

Jun. 25, 2002 (JP) ........................ 2002-183822

(51) Int. Cl.[7] ............................ H04N 5/91; H04N 7/00
(52) U.S. Cl. .................... 386/46; 369/47.13; 369/47.17
(58) Field of Search ..................... 386/46; 369/13.02, 369/47.13, 47.17

(56) References Cited

U.S. PATENT DOCUMENTS 3,829,838 A * 8/1974 Lewis et al. ................. 345/419
2002/0092019 A1 * 7/2002 Marcus ........................ 725/37

* cited by examiner

Primary Examiner—Thai Tran
Assistant Examiner—Alicia M Duggins
(74) Attorney, Agent, or Firm—Gerald T. Bodner

(57) ABSTRACT

A content recording/erasing apparatus includes a hard disk. An unnecessary MPEG file recorded on the hard disk is intermittently erased part by part in parallel with a normal recording process. It is noted that prior to a start of erasing the unnecessary MPEG file, time length data relating to a total amount of an actual remaining amount of the hard disk and the unnecessary MPEG file is set in a remaining amount register, and a setting value is periodically subtracted.

5 Claims, 20 Drawing Sheets

CONTENT RECORDING/ERASING APPARATUS

BACKGROUND OF THE INVENTION

1. Field of the Invention

The present invention relates to a content recording/erasing apparatus applied to a hard disk video recorder, for example. More specifically, the present invention relates to a content recording/erasing apparatus which intermittently erases an unnecessary content part by part from a recording medium in parallel with recording a desired content into the recording medium.

2. Description of the Prior Art

In the hard disk video recorder, it is possible to simultaneously execute recording/reproducing of content by making use of a characteristic of random access of the hard disk. Furthermore, when a remaining amount of the hard disk becomes less, an unnecessary content can be erased in parallel with recording.

It is noted that when an erasing process by one operation of the unnecessary content is intended to be performed in parallel with a recording process, a load of the CPU is too much depending upon the size of the unnecessary content and therefore, there is a possibility that the recording process is broken down.

Herein, if the unnecessary content is intermittently erased by a predetermined amount so as to prevent a sharp increase of the load, a breakdown of the recording process can be avoided. However, if so, in a case the erasing of the unnecessary content is guided on the screen and then the erasing process is started and the remaining amount of the hard disk (available capacity) is displayed on the screen, the displayed remaining amount is varied in a different manner than expected by the operator and therefore, there is a possibility of providing confusion to the operator.

SUMMARY OF THE INVENTION

Therefore, it is a primary object of the present invention to provide a content recording/erasing apparatus capable of executing a recording process and an erasing process of a content in parallel with each other and avoiding a situation in which an operator is confused by a display of a remaining amount.

According to the present invention, a content recording/erasing apparatus which intermittently erases an unnecessary content part by part from a recording medium in parallel with recording a desired content into the recording medium comprises: a first setter for setting in a register a numeral relating to a total amount of a remaining amount of the recording medium and an amount of the unnecessary content prior to a start of erasing the unnecessary content; and a subtracter for periodically subtracting the numeral set in the register.

The unnecessary content recorded on the recording medium is intermittently erased part by part in parallel with recording the desired content onto the recording medium. It is noted that a numeral relating to the total amount of the remaining amount of the recording medium and the amount of the unnecessary content is set in the register by the first setter prior to the start of erasing the unnecessary content. The numeral set in the register is periodically subtracted by the subtracter.

The intermittent partial erasing of the unnecessary content prevents the erasing process from being overloaded, and therefore, it is possible to perform the recording process and the erasing process of the content in parallel with each other. Furthermore, the numeral relating to the total amount of the remaining amount of the recording medium and the amount of the unnecessary content is set to the register by the first setter and the setting value of the register is periodically subtracted and therefore, the setting value of the register is varied in a manner as expected by the operator. Displaying the setting value of the register as a remaining amount of the recording medium, the operator is not confused by a display of the remaining amount.

When the erasing of the unnecessary content is completed, where the remaining amount of the recording medium is detected and the numeral relating to the detected remaining amount is set to the register, the setting value of the register reflects the actual remaining amount of the recording medium. It is noted that if the detection of the remaining amount is performed in a cycle longer than a subtraction cycle by the subtracter, a load of the remaining amount can be prevented.

It is preferable that a start of the erasing is guided prior to the start of the erasing the unnecessary content, and a remaining amount display is performed based on the numeral set in the register.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
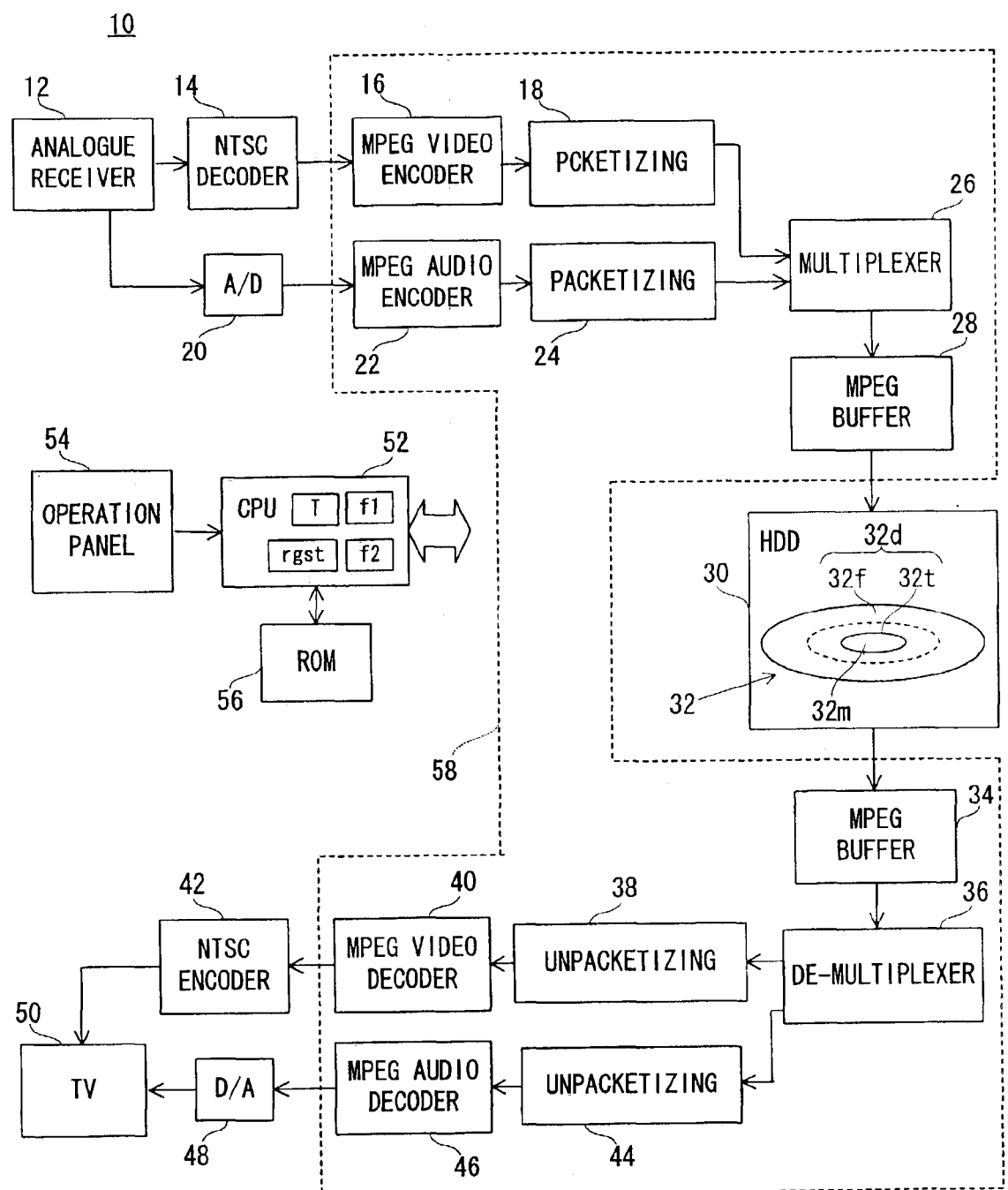
FIG. 1 is a block diagram showing one embodiment of the present invention.

Referring to FIG. 1, a hard disk video recorder 10 of this embodiment includes an analogue receiver 12. The analogue receiver 12 receives a high-frequency television signal from an antenna (not shown) and outputs a composite video signal and an audio signal of a desired channel. The composite video signal is applied to an NTSC decoder 14, and the audio signal is applied to an A/D converter 20. The NTSC decoder 14 decodes the applied composite video signal so as to output video data, and the A/D converter 20 performs A/D conversion on the audio signal so as to output audio data. The video data and the audio data are respectively applied to an MPEG video encoder 16 and an MPEG audio encoder 22 forming an MPEG codec 58.

The video data is converted into a video ES by an encoding process of an MPEG video encoder 16, and the converted video ES is converted into a video PES by a packetizing process of a packetizing circuit 18. On the other hand, the audio data is converted into an audio ES by encoding of the MPEG audio encoder 22, and the audio ES is converted into an audio PES by packetizing of a packetizing circuit 24.

A multiplexer 26 multiplexes the video PES and the audio PES respectively output from the packetizing circuits 18 and 24 into an MPEG-PS and applies the generated MPEG-PS to an HDD (Hard Disc Drive) 30 through an MPEG buffer 28. The HDD 30 creates in an internal hard disk 32 an MPEG file in which the MPEG-PS is stored. Thus, a desired program video and a program sound are recorded in the hard disk 32. It is noted that the program to be broadcasted or the MPEG file to be created in the hard disk 32 may be defined as "a content".

When the MPEG-PS is reproduced from the MPEG file recorded on the hard disk 32 by the HDD 30, the MPEG-PS is applied to a de-multiplexer 36 via an MPEG buffer 34. The de-multiplexer 36 extracts a video PES packet and an audio PES packet from the applied MPEG-PS, and the video PES packet and the audio PES packet are applied to unpacketizing circuits 38 and 44, respectively. The unpacketizing circuits 38 and 44 respectively convert the video PES and the audio PES into a video ES and an audio ES, and the converted video ES and the audio ES are respectively applied to an MPEG video decoder 40 and an MPEG audio decoder 46.

The MPEG video decoder 40 decodes the applied video ES so as to generate video data, and the generated video data is applied to an NTSC encoder 42. The video data is converted into a composite video signal by the NTSC encoder 42, and the converted composite video signal is output to a television receiver 50. Consequently, a reproduced video of a desired program is displayed on a monitor screen of the television receiver 50.

The MPEG audio encoder 46 decodes the applied audio ES so as to generate audio data. The generated audio data is converted into an analogue audio signal by a D/A converter 48, and the converted audio signal is output to the television receiver 50. Consequently, a reproduced sound of the desired program is output from a speaker of the television receiver 50.

It is noted that when an OSD display instruction is applied from a CPU 52 to the MPEG video decoder 40, the MPEG video decoder 40 multiplexes desired character data to video data. Thus, a character such as a text message or the like is displayed on the monitor screen in an OSD manner.

The HDD 30 adopts a UDF (Universal Disc Format) system as a file management system. The hard disk 32 is divided into a data area 32d and a file management area 32m. Furthermore, the data area 32d is logically divided into a temporary recording area 32t and a normal recording area 32f. The temporary recording area 32t is assigned with a capacity capable of storing 2.0 Mbps data for 4 hours, and the normal recording area 32f is assigned with a capacity capable of storing 2.0 Mbps data for 36 hours. The MPEG file is dispersedly recorded on a plurality of small areas forming data area 32d. The file management area 32m is written with a filename of the MPEG file and address information of small areas stored with partial data forming the MPEG file.

In this embodiment, any one of filenames of "RNGBUFF.mpg", "SAN * * * * .mpg" and "del * * * * .mpg" is assigned to the MPEG file (* * * *: file number). "RNGBUFF.mpg" is assigned to a temporary MPEG file created by a temporary recording, and "SAN * * * * .mpg" is assigned to a normal MPEG file created by a normal recording.

If a storing function of the temporary MPEG file is in an on state, a filename of the temporary MPEG file is later changed from "RNGBUFF.mpg" to "SAN * * * * .mpg". This renaming changes the temporary MPEG file to the normal MPEG file. Furthermore, when any one of the normal MPEG files is selected by an automatic erasing function or a manually erasing operation, the filename of the normal MPEG file is renamed from "SAN * * * * .mpg" to "del * * * * .mpg". This renaming changes the normal MPEG file to an unnecessary MPEG file.

Furthermore, when a protect function or a periodically overwriting function is set to the normal MPEG file, a predetermined extension is assigned to the filename of the normal MPEG file. When the protect function is set, the extension "lock" is added to the filename "SAN * * * * .mpg", and when the periodically overwriting function is set, the extension "over" is added to the filename "SAN * * * * .mpg". The filename to which the extension of "lock" or "over" is assigned is never renamed to "del * * * * .mpg". It is noted that the periodically overwriting function is a function to overwrite the MPEG-PS of a program broadcasted at a specified time zone on a specified day of the week to the same normal MPEG file.

Figure 2:
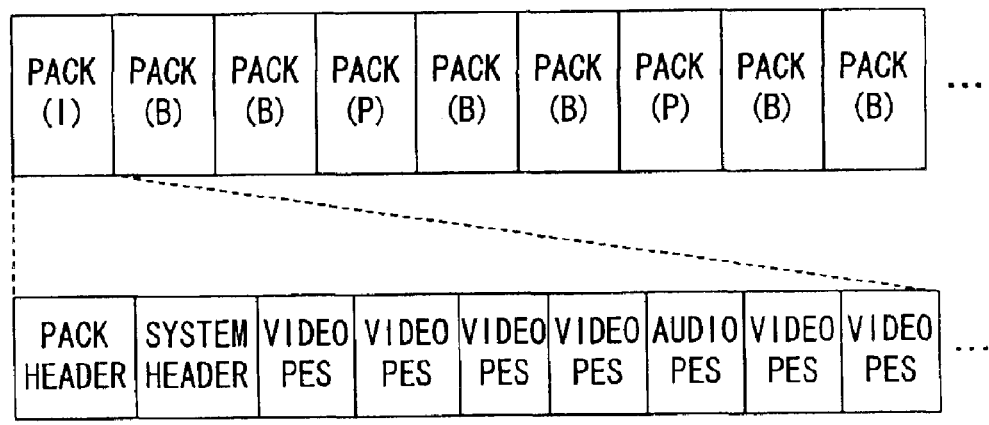
FIG. 2 is an illustrative view showing one example of data structure of an MPEG-PS.

The MPEG-PS has a data structure shown in FIG. 2. According to FIG. 2, the MPEG-PS is formed by a plurality of packs each of which includes a pack header, a system header, a video PES packet and an audio PES packet.

In an MPEG format, three frame types of an I picture, a B picture and a P picture are defined, and the video PES packets forming one picture never lie across a plurality of packs. That is, a plurality of video PES packets forming the I picture of a screen are included in a same pack, a plurality of video PES packets forming B picture of a screen are included in a same pack and a plurality of video PES packets forming P picture of a screen are included in a same pack.

Furthermore, if a system header is added to only the first pack forming the MPEG-PS, a condition of the MPEG format is satisfied. However, the MPEG video encoder 22 of the embodiment adopts a VBR (Variable Bit Rate) system, and a bit rate is changed every picture. Thus, each pack is assigned with the system header, and bit rate information is embedded in the system header.

It is noted that the audio PES packet is intermittently inserted between the video PES packets such that a reproduced video and a reproduced sound are synchronized with each other.

The CPU 52 reads a control program from a ROM 56 in response to the power-on, and processes flowcharts shown in FIG. 3 to FIG. 18 according to the control program. It is noted that the CPU 52 is a CPU loaded with a multitask OS, and a main task shown in FIG. 3 to FIG. 12, a remaining amount renewal task shown in FIG. 13 to FIG. 17 and an erasing task shown in FIG. 18 are executed in parallel with each other.

Figure 3:
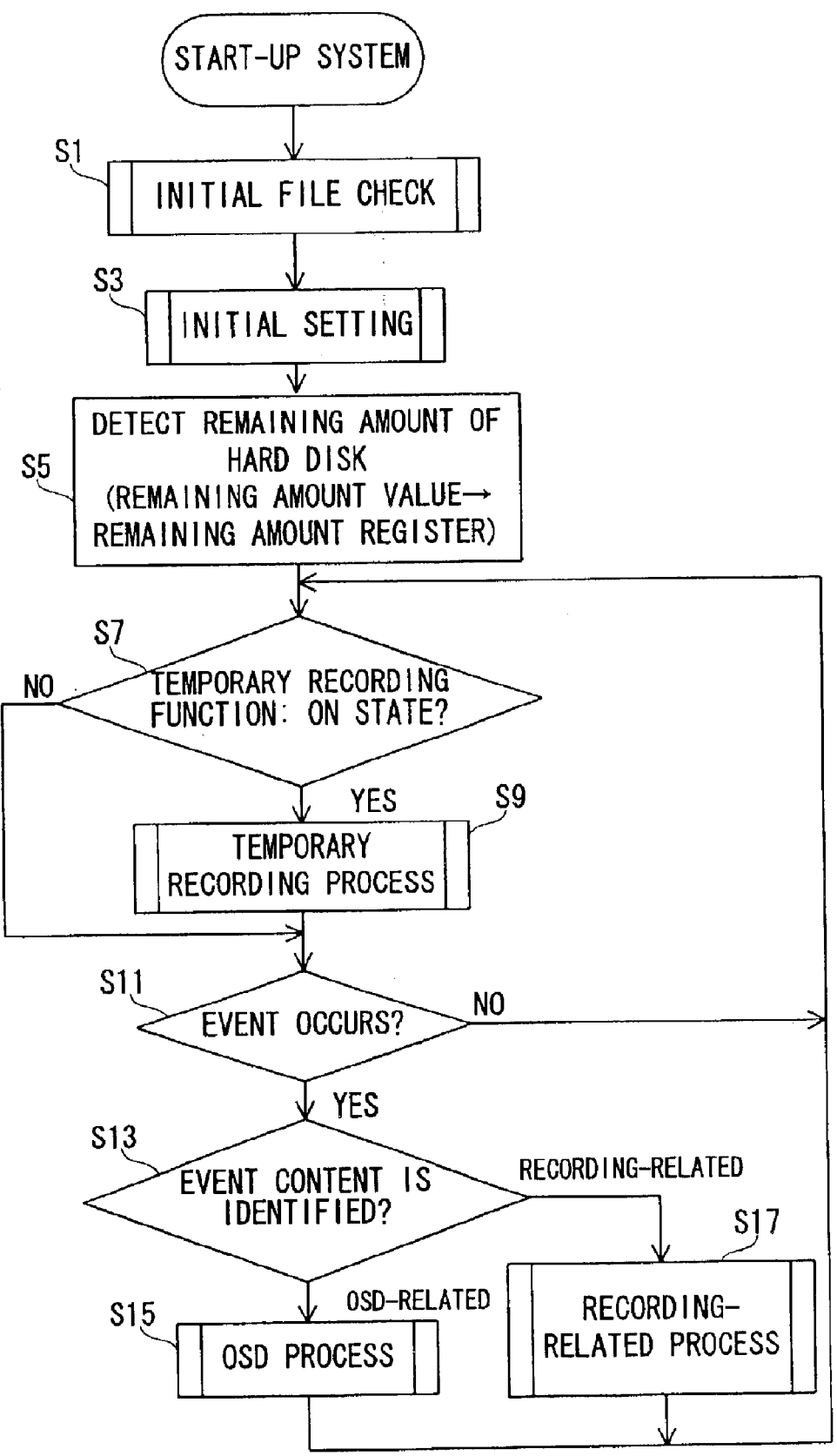
FIG. 3 is a flowchart showing a part of an operation of FIG. 1 embodiment.
Figure 4:
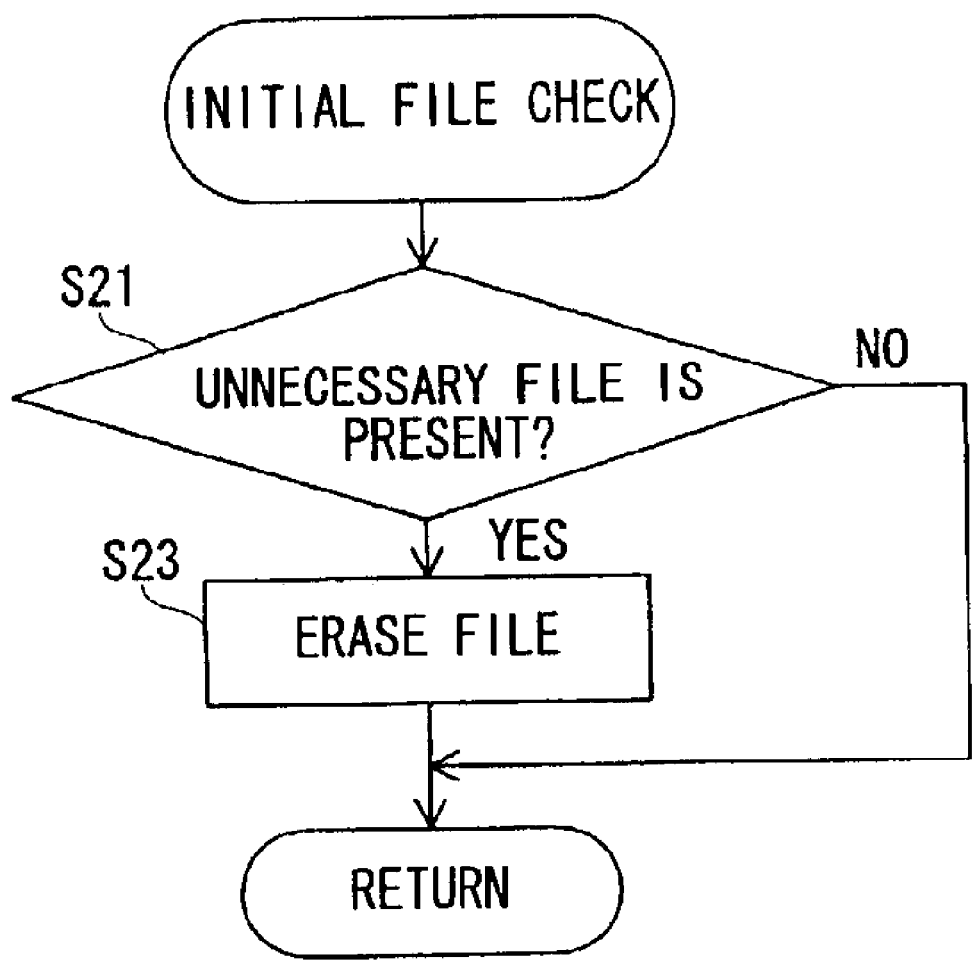
FIG. 4 is a flowchart showing another part of the operation of FIG. 1 embodiment.

Referring to FIG. 3, an initial file check process is performed in a step S1. The process is executed according to a subroutine shown in FIG. 4. First, it is determined whether or not the unnecessary MPEG file having the filename of "del * * * *.mpg" is present in the hard disk 32 in a step S21. If "NO" herein, the process is restored to an upper hierarchical level of a routine while if "YES", the unnecessary MPEG file is erased in a step S23 and then restored to the upper hierarchical level of the routine. In a case the power is previously turned off without completion of erasing the unnecessary MPEG file, the unnecessary MPEG file remaining in the hard disk 32 is entirely erased immediately after the power is currently turned on.

Returning to FIG. 3, an initialization process is performed in a step S3. More specifically, a codec task, a display task and a state check task of the MPEG codec 58 are started. A start-up of the codec task yields a state capable of encoding/decoding, a start-up of the display-task yields a state capable of OSD-displaying a message, and a state check task yields a state capable of checking a state of circuits within the MPEG codec 58.

In a step S5, an actual remaining amount of the normal recording area 32f formed on the hard disk 32 is detected, and time length data corresponding to the detected remaining amount is set in a remaining amount register rgst. More specifically, assuming that a transmission speed of the MPEG-PS is 2.0 Mbps, and the time length data obtained by dividing the actual remaining amount of the normal recording area 32f by the transmission speed (reference transmission speed) is set in the remaining amount register rgst.

It is determined whether or not a temporary recording function is in an on state in a step S7, and if in an off state, the process directly proceeds to a step S11 while if in an on state, a temporary recording process is performed in a step S9, and then, the process proceeds to the step S11. A temporary MPEG file having the filename of "RNG-BUFF.mpg" is created in the hard disk 32 by the temporary recording process in the step S9, and the MPEG-PS accumulated in the MPEG buffer 28 shown in FIG. 1 is written to the temporary MPEG file.

It is determined whether or not an event occurs due to a key operation of an operation panel 54 or arrival at a reserved time set in a timer T in the step S11. If no event occurs, the process from the steps S7 to S11 is repeated, and whereby, the MPEG-PS is accumulated in the temporary MPEG file. It is noted that the temporary MPEG file has only a capacity capable of storing 4 hours of MPEG-PS transferred at the above-described reference transmission speed. Therefore, an MPEG-PS captured after the temporary MPEG file has become full is overwritten to the prior MPEG-PS.

If any event occurs, the process proceeds from the step S11 to a step S13 so as to determine a content of the event. If the occurred event is an OSD-related event, an OSD process is executed in a step S15. On the contrary thereto, the occurred event is a recording-related event, a recording-related process is executed in a step S17. After completion of the process in the step S15 or S17, the process returns to the step S7.

Figure 5:
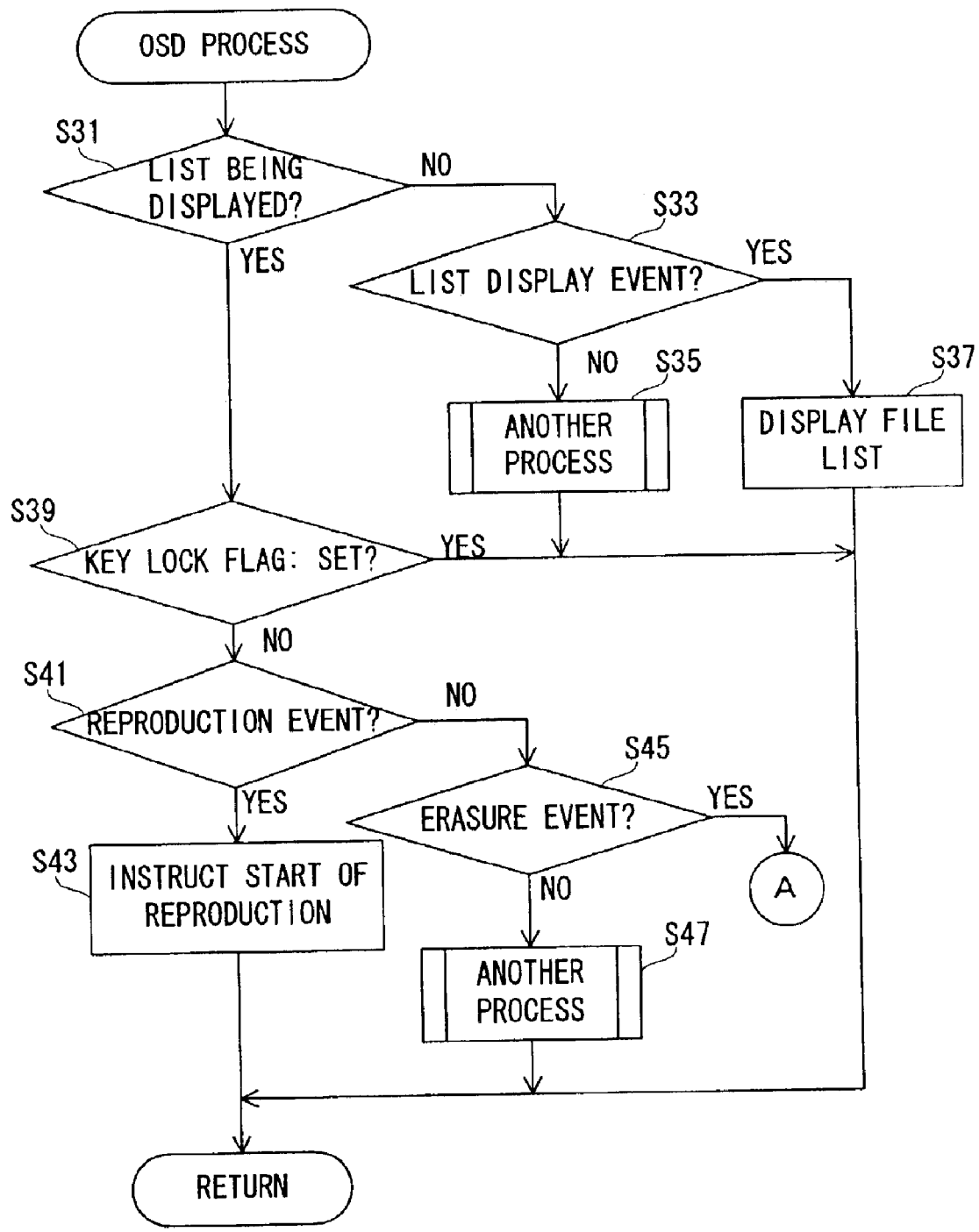
FIG. 5 is a flowchart showing the other part of the operation of FIG. 1 embodiment.
Figure 6:
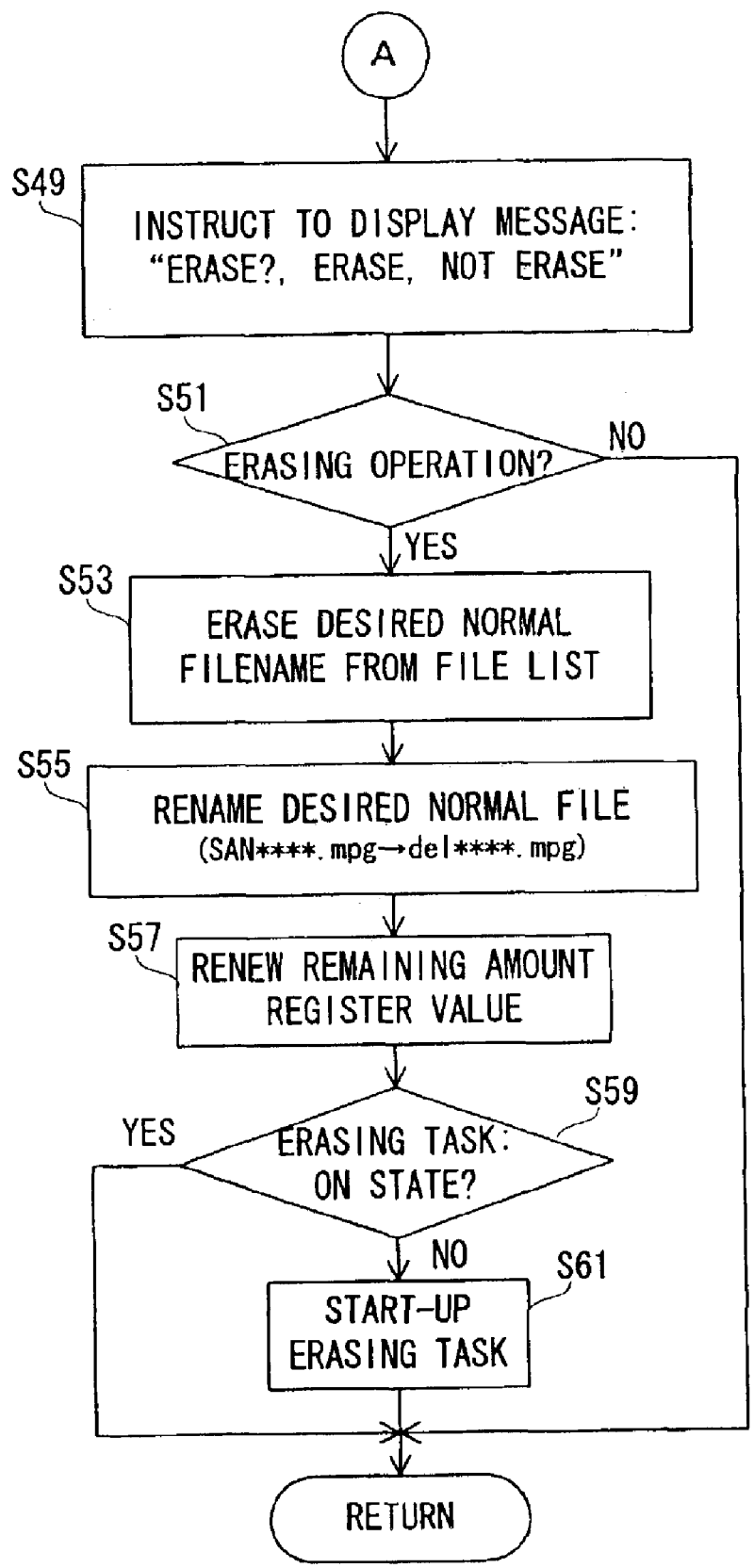
FIG. 6 is a flowchart showing a further part of the operation of FIG. 1 embodiment.

The OSD-related process in the step S15 complies with a flowchart shown in FIG. 5. First, it is determined whether or not a file list is being displayed in a step S31, and if "NO", it is determined whether or not the recording-related event is a list display event in a step S33. If the recording-related event is other than the list display event, another process is executed in a step S35 and then, the process is restored to an upper hierarchical level of a routine. On the other hand, if the recording-related event is the list display event, displaying of the file list is instructed to the MPEG video decoder 40 in a step S37 and then, the process is restored to the upper hierarchical level of the routine. The process in the step S37 allows the file list to be OSD-displayed on the monitor screen of the television receiver 50.

It is noted that the file list is a list for listing filenames of the normal MPEG files recorded in the hard disk 32. In the step S37, such the filenames are detected, and displaying of a list including the detected filenames is instructed to the MPEG video decoder 40.

If "YES" is determined in the step S31, a state of a key lock flag f1 is identified in a step S39, and if in a set state, the process is directly restored to the upper hierarchical level of the routine. Therefore, while the key lock flag f1 is in the set state, a key operation on the file list is invalidated. On the other hand, where the key lock flag f1 is in a reset state, it is determined whether or not the recording-related event is a reproduction event in a step S41, and it is determined whether or not the recording-related event is an erasure event in a step S45.

When it is determined to be the reproduction event, the process proceeds to a step S43, and a start of reproduction of the normal MPEG file pointed by a cursor on the file list is instructed to the MPEG codec 58. Thus, a program video and a program sound reproduced from the normal MPEG file are output from the television receiver 50. After completion of the step S43, the process is restored to the upper hierarchical level of the routine.

If neither the reproduction event nor the erasure event, "NO" is determined in the step S45, another process is performed in a step S47 and then, the process is restored to the upper hierarchical level of the routine. The process shifts to the step S47 when the cursor key is operated, for example. At this time, the cursor displayed on the file list is moved by the process in the step S47. After completion of the process in the step S47, the process is restored to the upper hierarchical level of the routine.

When it is determined to be the erasure event, the process proceeds from the step S45 to a step S49 so as to instruct displaying a text message of "ERASE?, ERASE, NOT ERASE" to the MPEG video decoder 40. A message inquiring whether or not the normal MPEG file is to be erased is OSD-displayed on the monitor screen of the television receiver 50. It is determined which is selected, "ERASE" or "NOT ERASE" in a step S51. When "ERASE" is selected, the process of steps S53 to S61 is performed, and then, the process is restored to the upper hierarchical level of the routine, and when "NOT ERASE" is selected, the process is directly restored to the upper hierarchical level of the routine.

The normal MPEG file pointed by the cursor on the file list is noted in the steps S53 and S55, the filename of the normal MPEG file is erased from the file list, and the filename of the normal MPEG file recorded in the file management area 32m of the hard disk 32 is changed from "SAN * * * * .mpg" to "del * * * * .mpg". The remaining amount register rgst is renewed in the step S57. More specifically, a time length is obtained by dividing the size of the renamed unnecessary MPEG file by 2.0 Mbps, and the obtained time length is added to the register value of the remaining amount register rgst. It is determined whether or not an erasing task is in the on state in the step S59, and if "YES", the process is restored to the upper hierarchical level of the routine while if "NO", the erasing task is started-up in the step S61 and then, the process is restored to the upper hierarchical level of the routine.

Figure 7:
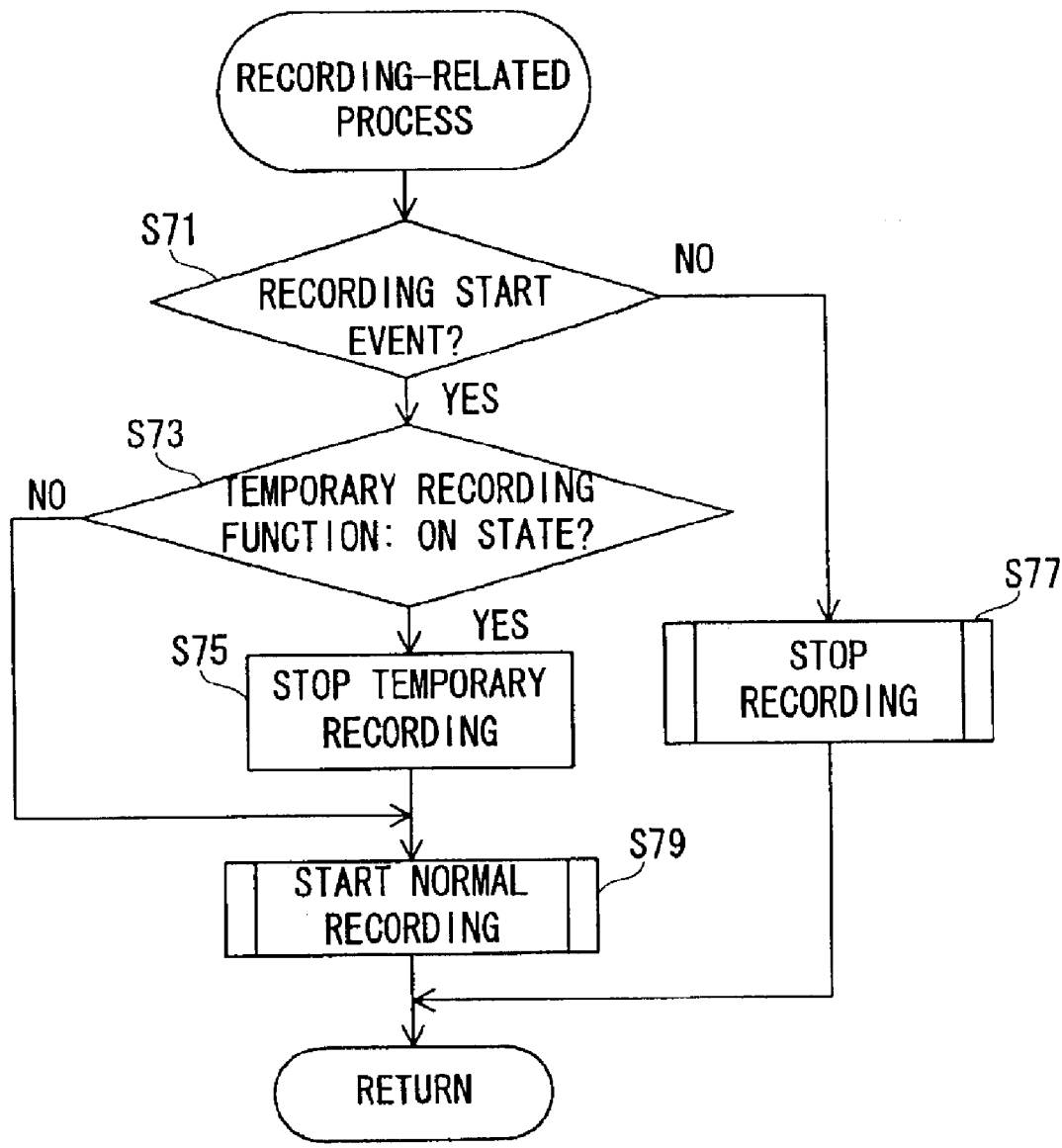
FIG. 7 is a flowchart showing another part of the operation of FIG. 1 embodiment.
Figure 8:
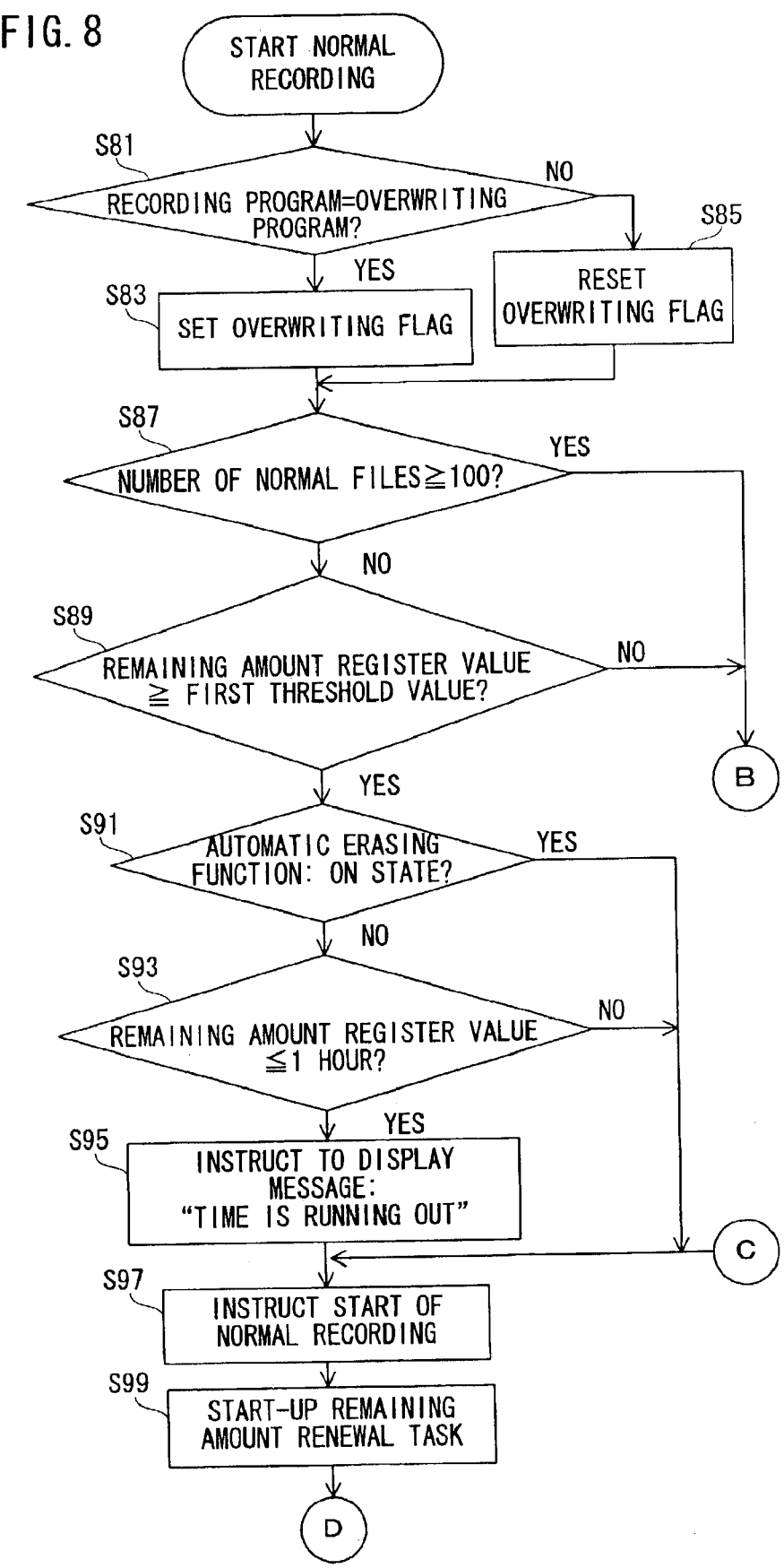
FIG. 8 is a flowchart showing the other part of the operation of FIG. 1 embodiment.

The recording-related process in the step S17 shown in FIG. 3 complies with a subroutine shown in FIG. 7. First, it is determined whether the recording-related event is a recording start event or a recording stop event in a step S71. If the recording stop event, "NO" is determined in the step S71, a recording end process is performed in a step S77, and then, the process is restored to an upper hierarchical level of a routine.

On the other hand, if it is determined to be the recording start event, it is determined whether or not the temporary recording function is in the on state in a step S73. Then, when "NO" is determined, the process directly proceeds to a step S79, and when "YES" is determined, the temporary recording is stopped in a step S75 and then, the process proceeds to the step S79. A normal recording start process is performed in the step S79, and after completion of the process, the process is restored to the upper hierarchical level of the routine.

The normal recording start process in the step S79 complies with a subroutine shown in FIG. 8 to FIG. 11. First, it is determined whether or not a recording program is an overwriting program in a step S81. More specifically, it is determined whether or not the program to be recorded is a program to be broadcasted at a specified time zone on a specified day of the week and to be written to the MPEG file in which a periodically overwriting function is validated. If "YES" is determined herein, an overwriting flag f2 is set in a step S83, and then, the process proceeds to a step S87 while if "NO" is determined, the overwriting flag f2 is reset in the step S85 and then, the process proceeds to the step S87.

The number of the normal MPEG files saved in the hard disk 32 is identified in the step S87, and a setting value of the remaining amount register rgst is identified in a step S89. Where the number of the normal MPEG files is equal to or more than 100, or where the setting value of the remaining amount register rgst is less than a first threshold value (="temporary recording time period"+15 minutes), it is considered that a remaining amount (available capacity) must be retained in the normal recording area 32f prior to the start of the normal recording, and the process shifts to a step S101. On the contrary thereto, where the number of the normal MPEG files is less than 100 and the setting value of the remaining amount register rgst is equal to or more than the first threshold value, it is considered that the normal recording can be started without reserving the remaining amount, and then, the process proceeds to a step S91.

Herein, if a saving function of the temporary MPEG file is in the on state, "temporary recording time period" forming the first threshold value is a time period obtained by dividing the size of the temporary MPEG file created prior to the normal recording operation by 2.0 Mbps (noted that an upper limit is 4 hours). If the saving function of the temporary MPEG file is in the off state, "temporary recording time period" is made 0 minute. Such the determining of the first threshold value allows to preliminarily retain a capacity for normally saving the temporary MPEG file.

It is determined whether or not the automatic erasing function is in the on state in the step S91, and the setting value of the remaining amount register rgst is equal to or less than 1 hour in a step S93. Then, where the automatic erasing function is in the on state or where the setting value of the remaining amount register rgst exceeds 1 hour, the process directly proceeds to a step S97. On the other hand, where the automatic erasing function is in the off state and the setting value of the remaining amount register rgst is equal to or less than 1 hour, displaying of a text message of "TIME IS RUNNING OUT" is instructed to the MPEG video decoder 40 and then, the process proceeds to the step S97. A message indicative of less remaining amount of the hard disk 32 is displayed on the monitor screen of the television receiver 50 by the process in the step S97.

A start of the normal recording is instructed to the MPEG codec 58 in the step S97, and a remaining amount renewal task is started-up in a step S99. By the process in the step S97, a normal MPEG file is newly created, and writing of the MPEG-PS to the normal MPEG file is started. Furthermore, the remaining amount renewal task shown in FIG. 13 to FIG. 17 is started-up by the process in the step S99.

Figure 9:
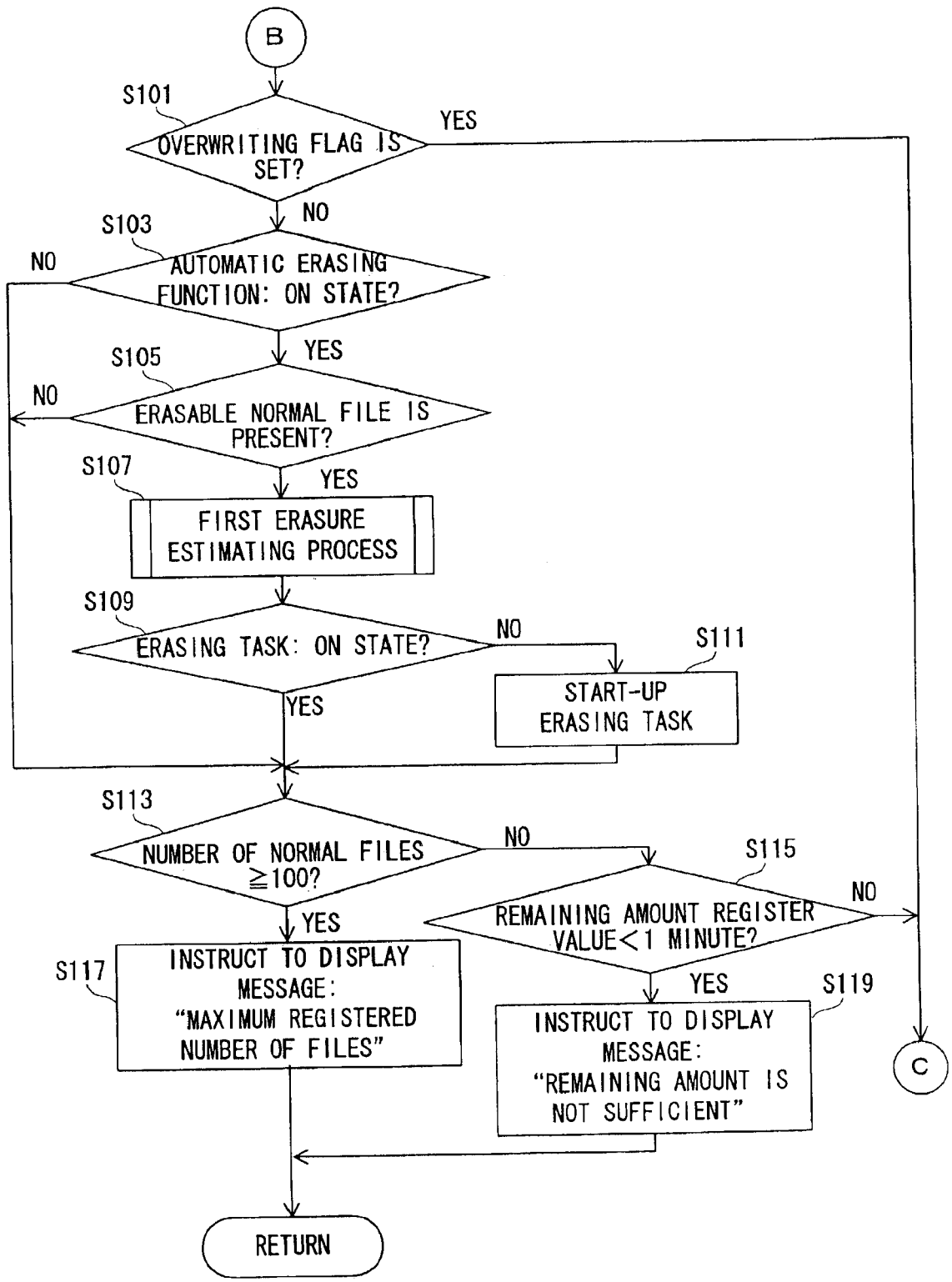
FIG. 9 is a flowchart showing a further part of the operation of FIG. 1 embodiment.

Referring to FIG. 9, a state of the overwriting flag f2 is determined in a step S101. When the overwriting flag f2 is in a set state, the available capacity is considered to be retained, and the process shifts to the step S97 so as to start the normal recording. When the overwriting flag f2 is in a reset state, it is determined whether or not the automatic erasing function is in the on state in a step S103, and it is determined whether or not an erasable normal MPEG file is present in the hard disk 32 in a step S105. Where the automatic erasing function is in the off state or where the erasable normal MPEG file is not present, the process directly shifts to a step S113. On the contrary thereto, where the automatic erasing function is in the on state and the erasable normal MPEG file is present, a first erasure estimating process is executed in a step S107, and it is determined whether or not the erasing task is in the on state in a step S109. Then, if the erasing task is in the on state, the process directly proceeds to the step S113 while if the erasing task is in the off state, the erasing task is started-up in a step S111, and then, the process proceeds to the step S113.

It is noted that the erasable normal MPEG file is a file having a filename to which neither the extension of "lock" nor "over" is added out of the normal MPEG files. Furthermore, to be described later, the erasable normal MPEG file is changed to the unnecessary MPEG file by the first erasure estimating process.

It is determined whether or not the number of the normal MPEG files is equal to or more than 100 in the step S113, and it is determined whether or not the setting value of the remaining amount register rgst is less than 1 minute in a step S115. Then, where the number of the normal MPEG files is less than 100 and the setting value of the remaining amount register rgst is equal to or more than 1 minute, the process shifts to the step S97 so as to start the normal recording.

It is noted that the setting value of the remaining amount register rgst is compared with the first threshold value in the step S89 while the setting value of the remaining amount register rgst is compared with 1 minute in the step S115. That is because the step S89 is a determining process for determining whether or not an available capacity needs to be retained, and the step S115 is a determination process for determining whether or not the normal recording is actually started, and therefore, determination criteria are strictly different from each other.

When the number of the normal MPEG files is determined to be equal to or more than 100 in the step S113, displaying of a text message indicative of "MAXIMUM REGISTERED NUMBER OF FILES" is instructed to the MPEG video decoder 40. In addition, when the setting value of the remaining amount register rgst is determined to be less than 1 minute in the step S115, displaying of a text message indicative of "REMAINING AMOUNT IS NOT SUFFICIENT" is instructed to the MPEG video decoder 40 in a step S119. In both processes, a message indicative of incapability of recording is displayed on the monitor screen of the television receiver 50. After completion of the step S117 or the step S119, the process is restored to the upper hierarchical level of the routine without starting the normal recording.

Figure 10:
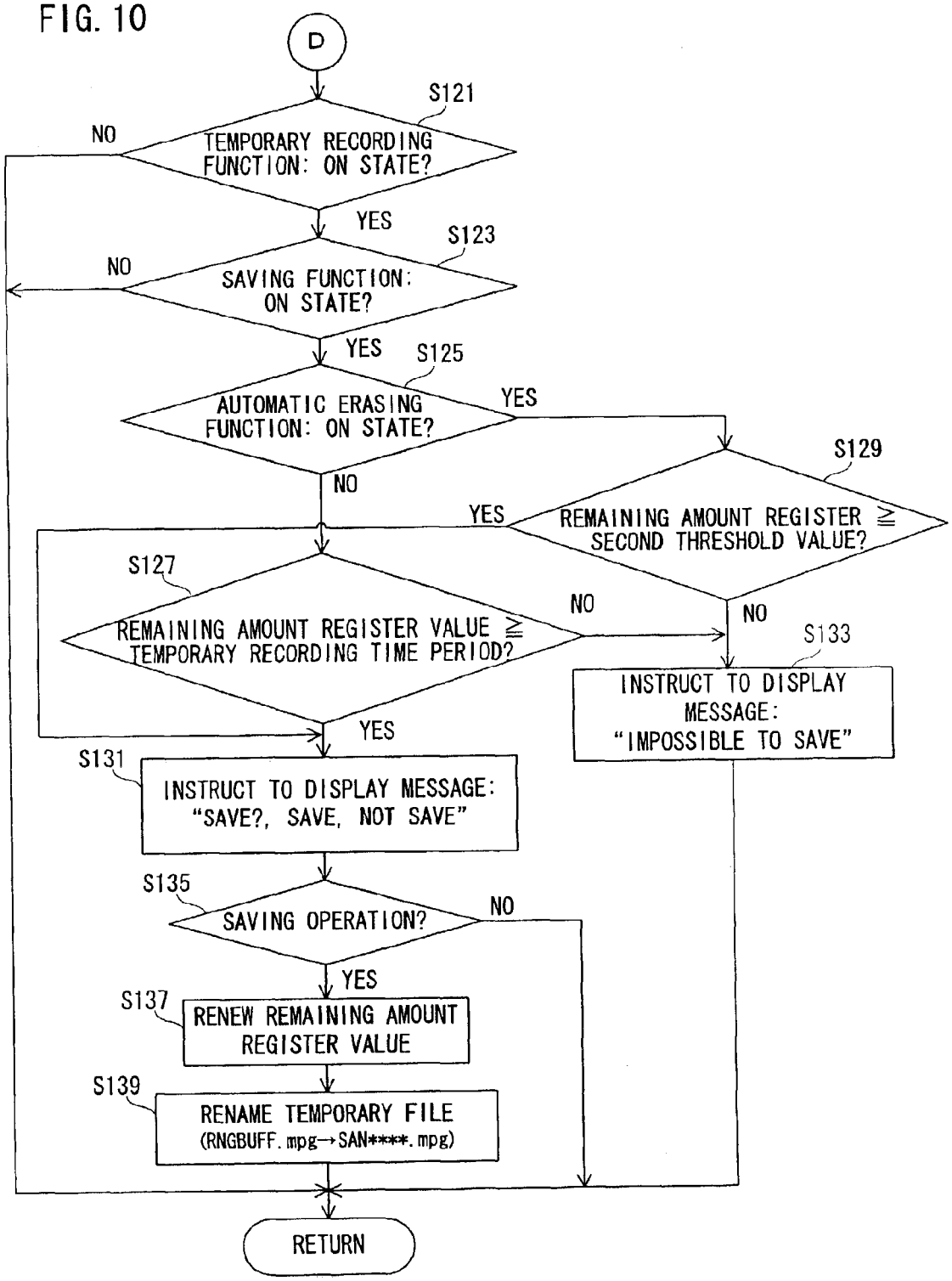
FIG. 10 is a flowchart showing another part of the operation of FIG. 1 embodiment.

Referring to FIG. 10, it is determined whether or not the temporary recording function is in the on state in a step S121, and it is determined whether or not the saving function of the temporary MPEG file is in the on state in a step S123. If the temporary recording function is in the off state, or even if the temporary recording function is in the on state, if only the saving function is in the off state, the process is directly restored to the upper hierarchical level of the routine.

On the other hand, where both the temporary recording function and the saving function are in the on state, the state of the automatic erasing function is identified in a step S125, and the setting value of the remaining amount register rgst is identified in a step S127 or a step S129. More specifically, if the automatic erasing function is in the on state, it is determined whether or not the setting value of the remaining amount register rgst is equal to or more than "temporary recording time period" in the step S127. Furthermore, if the automatic erasing function is in the off state, it is determined whether or not the setting value of the remaining amount register rgst is equal to or more than a second threshold value (="temporary recording time perid"+30 minutes) in the step S129. It is noted that "temporary recording time period" being a reference of the process in the step S127 and "temporary recording time period" forming the second threshold value are synonymous with "temporary recording time period" forming the first threshold value.

If "YES" is determined in the step S127 or S129, displaying of a text message of "SAVE?, SAVE, NOT SAVE" is instructed to the MPEG decoder 40 in a step S131. A message inquiring saving of the temporary MPEG file is displayed on the monitor screen of the television receiver 50. It is determined which is selected, "SAVE" or "NOT SAVE" in a step S135. If "NOT SAVE" is selected here, "NO" is determined in the step S135, and then, the process is directly restored to the upper hierarchical level of the routine. On the other hand, if "SAVE" is selected, the process proceeds from the step S135 to a step S137, and "temporary recording time period" is subtracted from the setting value of the remaining amount register rgst. In a following step S139, the filename is changed from "RNGBUFF.mpg" to "SAN * * * * .mpg" so as to change the temporary MPEG file to the normal MPEG file, and then, the process is restored to the upper hierarchical level of the routine.

In a case the automatic erasing function is in the on state, renaming of the temporary MPEG file is performed when the setting value of the remaining amount register rgst is equal to or more than the second threshold value (="temporary recording time period"+30 minutes). This makes it possible to retain at least 30 minutes of capacity for the normal recording.

If "NO" is determined in the step S127 or the step S129, displaying of a text message of "IMPOSSIBLE TO SAVE" is instructed to the MPEG decoder 40 in a step S133. A message indicative of impossibility of saving the temporary MPEG file is displayed on the monitor screen of the television receiver 50. After completion of the process in the step S133, the process is restored to the upper hierarchical level of the routine.

It is noted that the reason why not the first threshold value but the second threshold value is used as a comparative object in the step S129 is as follows. That is, in a second erasure estimating process executed after the start of the normal recording (referring to FIG. 16 to FIG. 17), the erasable normal MPEG file starts to be renamed to the unnecessary MPEG file at a time the setting value of the remaining amount register rgst is less than 15 minutes, and the renaming process is ended at a time the setting value of the remaining amount register rgst is increased to 30 minutes. Thereupon, in a case all the normal MPEG files existing before the start of the normal recording are set with the protect function, the temporary MPEG file may be renamed to the unnecessary MPEG file through the normal MPEG file. A margin of 15 minutes being a difference between the first threshold value and the second threshold value is of providing an opportunity for setting the protect function to the MPEG file during the 15 minutes from being renamed to the normal MPEG file to being renamed to the unnecessary MPEG file.

Figure 11:
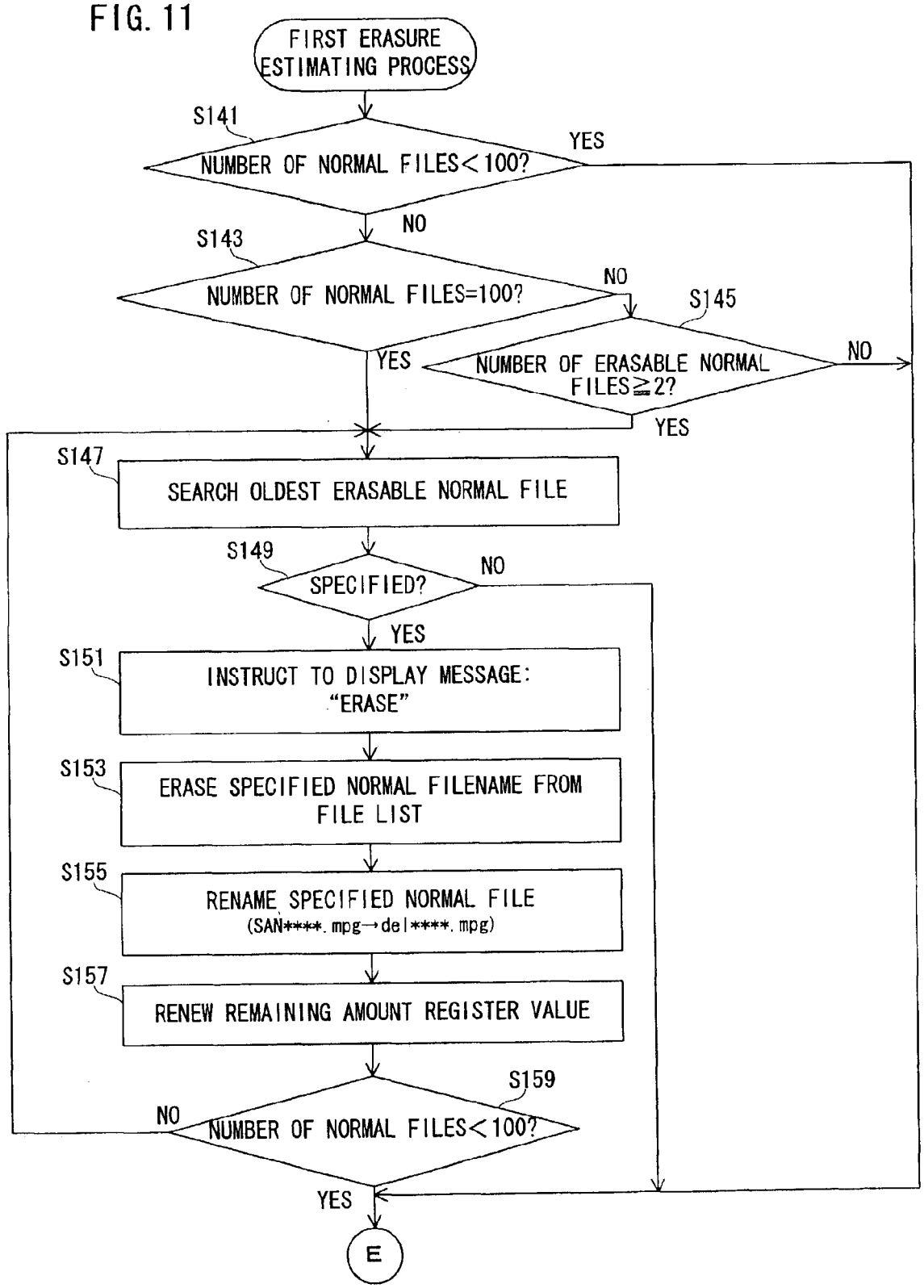
FIG. 11 is a flowchart showing the other part of the operation of FIG. 1 embodiment.
Figure 12:
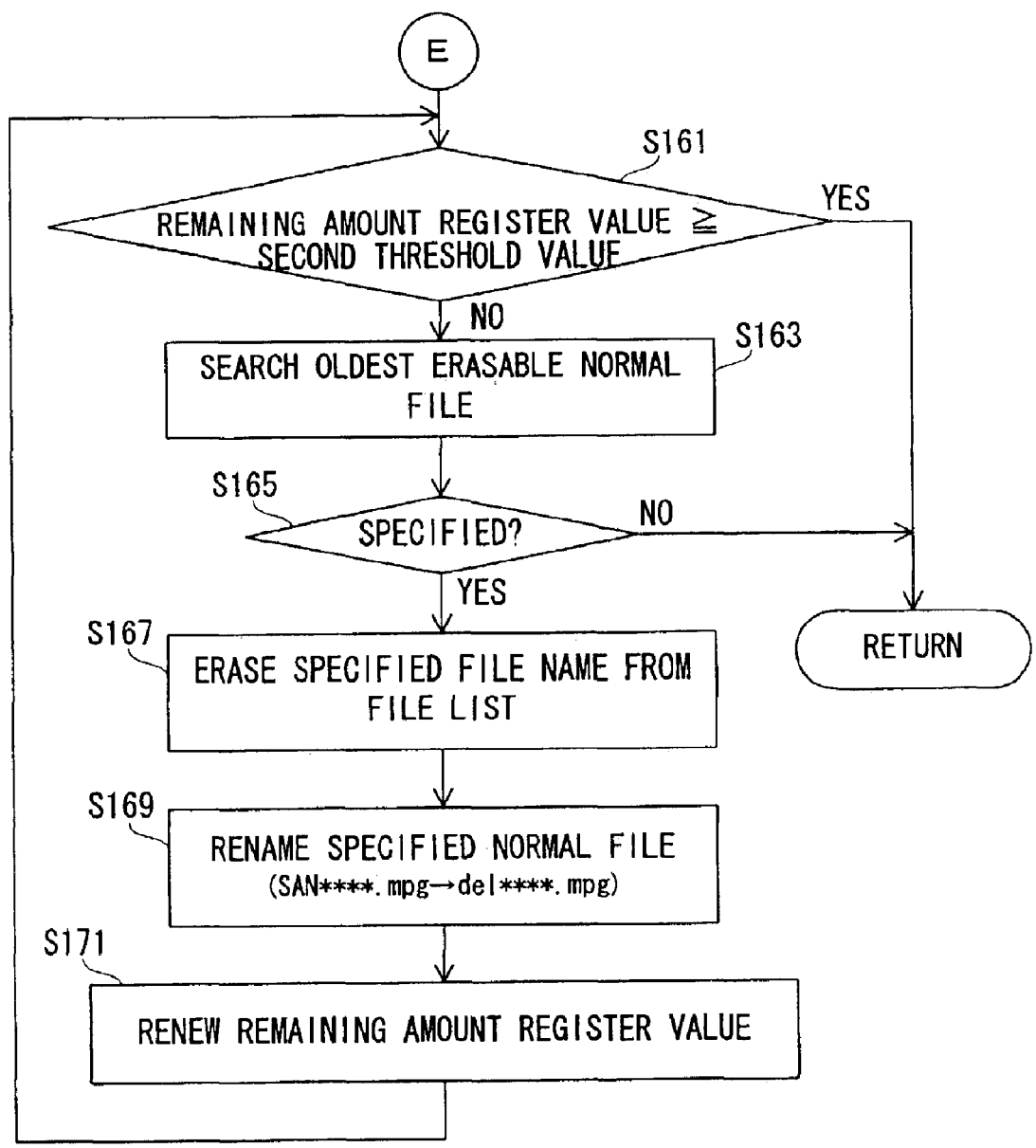
FIG. 12 is a flowchart showing a further part of the operation of FIG. 1 embodiment.

The first erasure estimating process in the step S107 shown in FIG. 9 is complies with a subroutine shown in FIG. 11 and FIG. 12. First, the number of the normal MPEG files recorded in the hard disk 32 is determined in steps S141 and S143. If the number of the normal MPEG files is less than 100, "YES" is determined in the step S141, and the process directly proceeds to a step S161. If the number of the normal MPEG files is 100, the process proceeds to a step S147, and if the number of the normal MPEG files is 101, the number of the erasable MPEG files is identified in a step S145. When the number of the erasable normal MPEG files is one, the process directly proceeds to a step S159, and when the number of the erasable normal MPEG files is more than one, the process proceeds to the step S147.

It is noted that in this embodiment, an upper limit of the number of the normal MPEG files to be saved in the hard disk 32 is 100 in principle. However, if the saving function of the temporary MPEG file is in the on state, the number of the normal MPEG files results in increasing up to 101 when the normal recording is started in a state the number of the normal MPEG files is 99. Consequently this embodiment exceptionally allows a situation that the number of the normal MPEG files saved becomes 101, and executes a process taking such the situation into account.

An oldest erasable normal MPEG file is searched in the step S147. More specifically, a normal MPEG file having the oldest creation date is searched out of the normal MPEG files to which neither "lock" nor "over" is added. It is determined whether or not the normal MPEG file is specified in a step S149, and if "NO" is determined, the process directly proceeds to the step S159.

If "YES" is determined in the step S149, displaying a message of "ERASE" is instructed to the MPEG video decoder 40 in a step S151. Consequently, erasing of the normal MPEG file recorded on the hard disk 32 is guided through the monitor screen of the television receiver 50. A filename of the specified normal MPEG file is erased from the file list in a step S153, and the filename of the specified normal MPEG file is changed form "SAN * * * * .mpg" to "del * * * * .mpg" in a step S155. In a step S157, a size of the specified normal MPEG file is divided by 2.0 Mbps, and a divided value is added to a current setting value of the remaining amount register rgst. It is determined whether or not the number of the normal MPEG files remaining in the hard disk 32 becomes less than 100 in a step S159, and if "NO", the process returns to the step S147 while if "YES", the process proceeds to the step S161.

If the normal MPEG files of 100 or 101 exit, and most of all are erasable files, the number of the normal MPEG files decreases up to 99 by the above-described processing.

The setting value of the remaining amount register rgst is compared with the second threshold value in the step S161. In a case a relationship of the setting value≧the second threshold value is determined, it is considered that a sufficient time period of remaining amount is retained by file renaming, and the process is restored to the upper hierarchical level of the routine. On the other hand, if a relationship of the setting value<the second threshold value is determined, further file renaming is performed in a step S163 and the subsequent. First, an oldest erasable normal MPEG file is searched in the step S163, and it is determined whether or not such the normal MPEG file is specified in a step S165. If "NO" here, the process is restored to the upper hierarchical level of the routine while if "YES", a process in the same manner as the above-described steps S153 to S157 is performed in the step S167 to S171 and then, the process returns to the step S161. Accordingly, if many erasable normal MPEG files exist, the normal MPEG file is changed to the unnecessary MPEG file by the file renaming, and the setting value of the remaining amount register rgst is increased.

Figure 13:
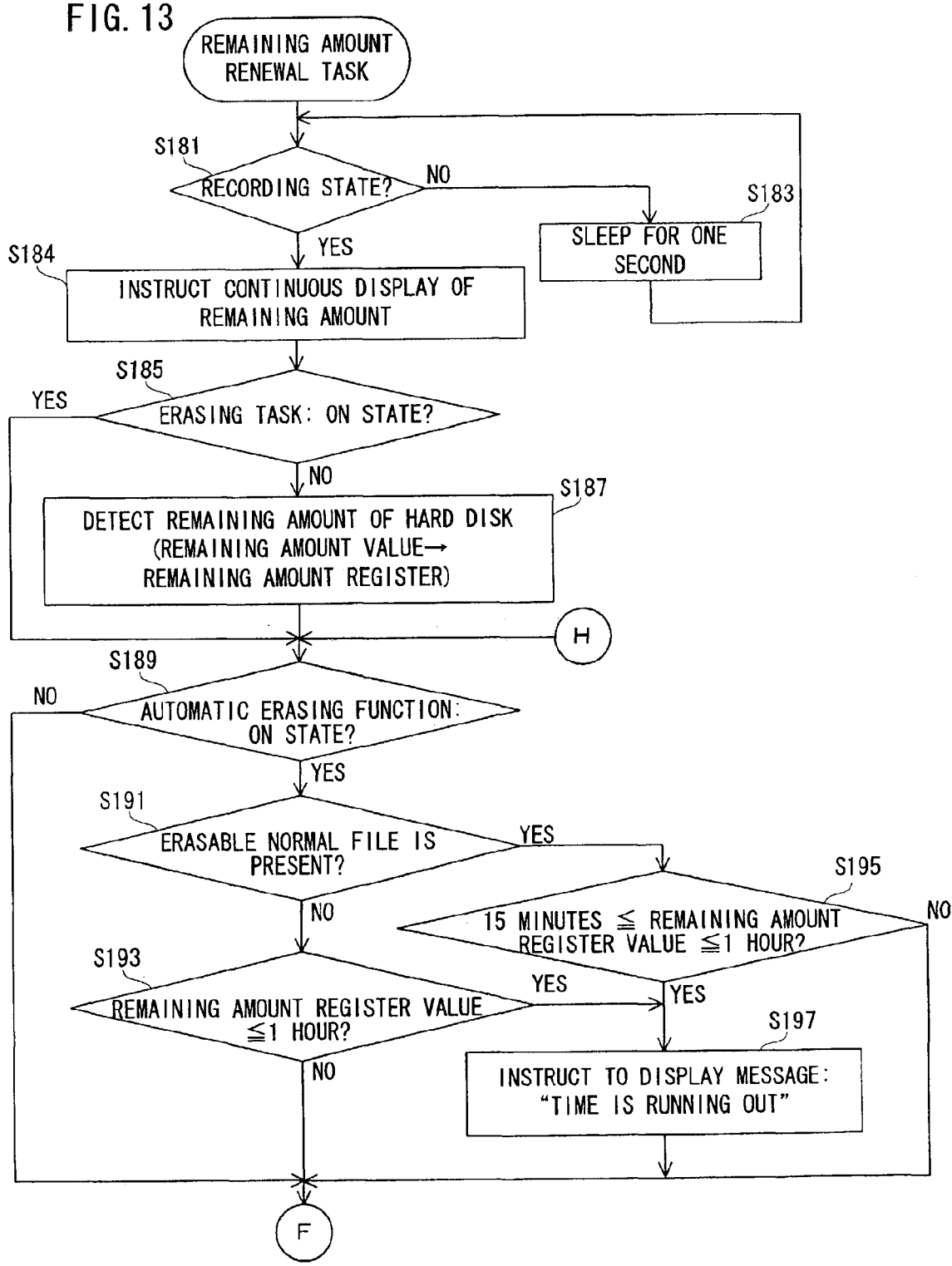
FIG. 13 is a flowchart showing another part of the operation of FIG. 1 embodiment.

Referring to FIG. 13, in the remaining amount renewal task, it is firstly determined whether or not a current operation state is a recording state in a step S181. If in a recording stopped state, the process shifts to a sleeping state for 1 second in a step S183, and then, the process returns to the step S183. On the other hand, if in a recording state, the process proceeds to a step S184 so as to instruct the MPEG video decoder 40 to continuously display the setting value of the remaining amount register rgst. Consequently, the setting value of the remaining amount register is constantly detected by the MPEG video decoder 40, and the setting value, i.e. the remaining amount is real-time displayed on the monitor screen of the television receiver 50.

A state of the erasing task is determined in a step S185, and if in the on state, the process directly proceeds to a step S189 while if in the off state, a process the same as the step S5 is performed in the step S185 and then, the process proceeds to a step S187. An actual remaining amount of the normal recording area 32f at this time is detected by the process in the step S185, the detected actual remaining amount is divided by 2.0 Mbps, and the divided value, i.e., the time length data is set to the remaining amount register rgst.

A state of the automatic erasing function is determined in the step S189, and if in the off state, the process directly proceeds to a step S199. On the contrary thereto, if the automatic erasing function is in the on state, it is determined whether or not an automatic erasable normal MPEG file exists in a step S191, and the setting value of the remaining amount register rgst is identified in a step S193 or a step S195.

That is, if no erasable normal MPEG file exists, it is determined whether or not the setting value of the remaining amount register rgst is equal to or less than 1 hour in the step S193, and if the erasable normal MPEG fiel exists, it is determined whether or not the setting value of the remaining amount register rgst is equal to or more than 15 minutes and equal to or less than 1 hour in the step S195. If "NO" is determined in the step S193 or the step S195, the process directly proceeds to a step S199. If "YES" is determined in the step S193 or the step S195, displaying of a text message of "TIME IS RUNNING OUT" is instructed to the MPEG video decoder 40, and then, the process proceeds to the step S199.

In the second erasure estimating process described later, file renaming for retaining the remaining amount is started when it is determined the setting value of the remaining amount register rgst is less than 15 minutes. Thereupon, if neither step S191 nor step S195 is performed, there is a case that a sufficient remaining amount is retained by the file renaming immediately after the message of "TIME IS RUNNING OUT" is displayed. For example, in a case the setting value of the remaining amount register rgst detected in the step S187 is 10 minutes and many erasable normal MPEG files exists, the remaining amount is retained by the second erasure estimating process directly after the message of "TIME IS RUNNING OUT" is displayed. Thus, the operator is confuzed. Consequently, in this embodiment, a lower limit of 15 minutes is provided in the determination process of the step S195, and if the erasable normal MPEG file exists, the process shifts to the step S195.

It is determined whether or not a current operation state is in the recording state in the step S199, and if in the recording stopped state, the remaining amount renewal task is completed. On the other hand, if the current operation state is in the recording state, the setting value of the remaining amount register rgst is identified in a step S201, and a continuous recording time period is identified in a step S203. When the setting value of the remaining amount register rgst is reduced up to 0 or when the continuous recording time period is reached to 24 hours, a stop of the recording is instructed to the MPEG codec 58 in a step S207. When the MPEG codec 58 stops recording, "YES" is determined in a step S209, and displaying of a text message of "RECORDING IS STOPPED" is instructed to the MPEG video decoder 40 in a step S211 and then, the remaining amount renewal task is completed. A guide of stop reading is displayed on the monitor screen of the television receiver 50 by the process in the step S211.

If the setting value of the remaining amount register rgst is more than 0 and the continuous recording time period is less than 24 hours, a sleep process is performed for 1 second in a step S205, and the process proceeds to a step S213. It is determined whether or not the erasing task is in the on state in the step S213, it is determined whether or not 2 minutes have elapsed from the previous detection of the remaining amount of the normal recording area 32f in a step S215, and it is determined whether or not the setting value of the remaining amount register rgst at this time is less than 1 minute in a step S217.

If "YES" is determined in the step S213 or if "NO" is determined in all the steps S213 to S217, 1 second is subtracted form the setting value of the remaining amount register rgst in a step S219. If "NO" is determined in the step S213 and if "YES" is determined in the step S215 or S217, a process in the same manner as the step S5 is performed in a step S225. Accordingly, if the erasing task is in the on state, the setting value of the remaining amount register rgst is subtracted second by second all the time, and an actual remaining amount of the normal recording area 32f is not to be reflected in the setting value of the remaining amount register rgst. On the contrary thereto, if the erasing task is in the off state, the actual remaining amount of the normal recording area 32f is intermittently detected in parallel with the subtraction of the setting value of the remaining amount register rgst, and the detected actual remaining amount is reflected in the setting value of the remaining amount register rgst.

It is noted that it is possible to prevent the setting value of the remaining amount register rgst from taking a minus polarity by constantly detecting the actual remaining amount of the normal recording area 32f when the setting value of the remaining amount register rgst is lower than 1 minute.

A state of the automatic erasing function is determined in a step S223, and it is determined whether or not the erasable normal MPEG file is present in a step S225. Then, if the automatic erasing function is in the off state or the erasable normal MPEG file is not present in the hard disk 32, the process is directly returned to the step S189. On the other hand, if the automatic erasing function is in the on state and the erasable normal MPEG file is present in the hard disk 32, the second erasure estimating process is performed in a step S227, and it is determined whether or not the erasing task is in the on state in a step S229. Then, if the erasing task is in the on state, the process is directly returned to the step S189 while if the erasing task is in the off state, the erasing task is started-up in a step S231 and then, the process is returned to the step S189.

Figure 16:
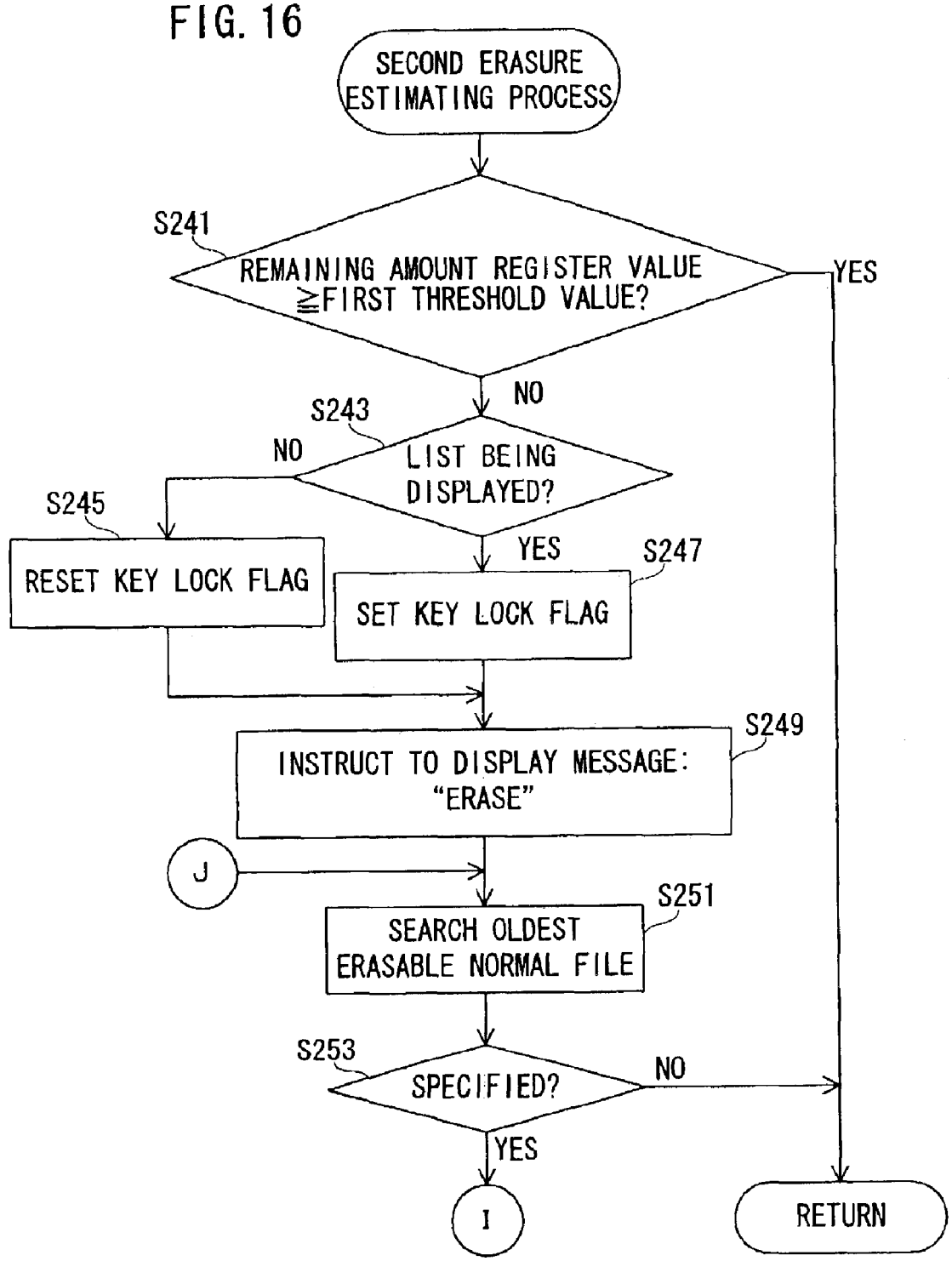
FIG. 16 is a flowchart showing another part of the operation of FIG. 1 embodiment.
Figure 17:
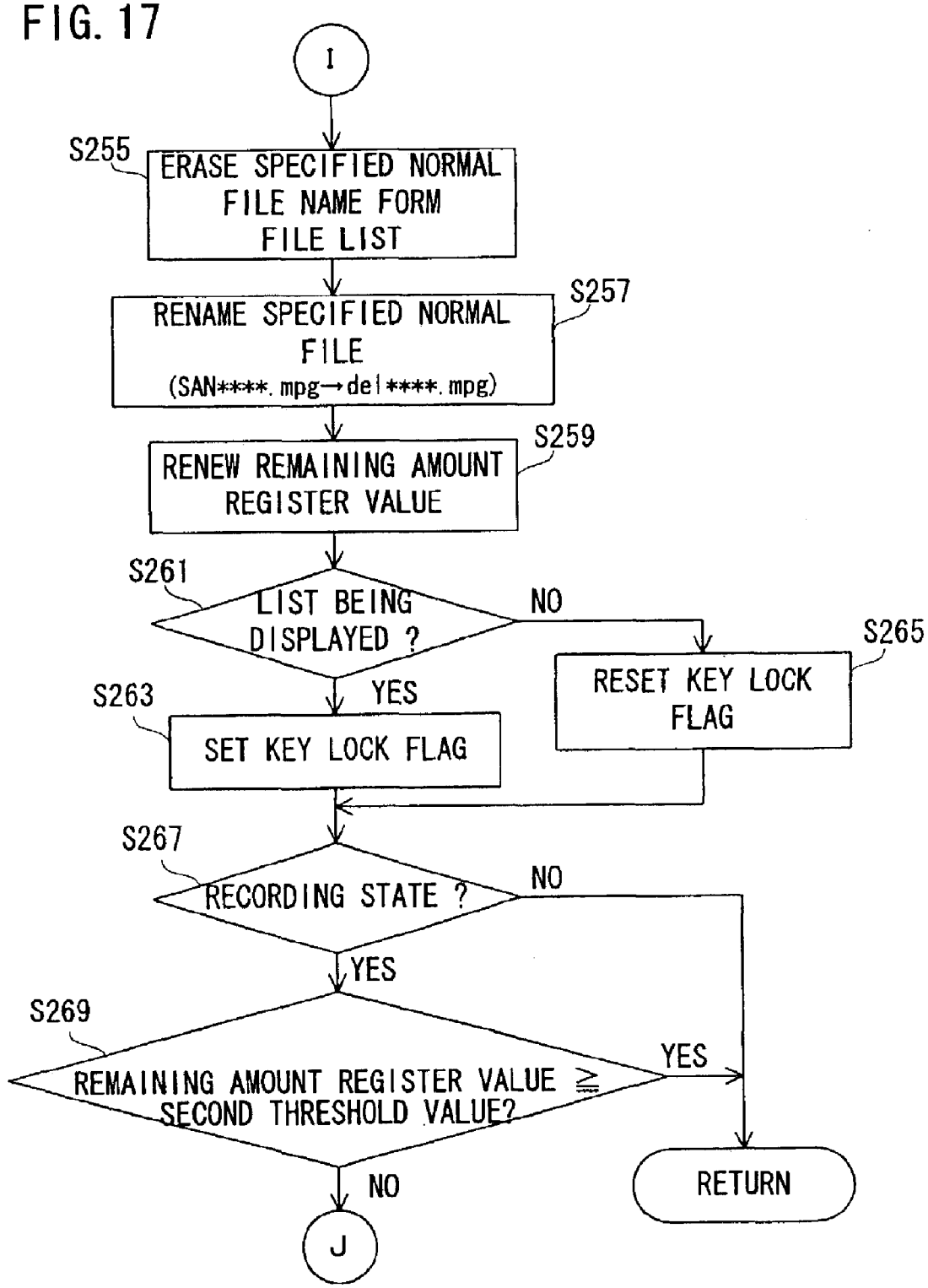
FIG. 17 is a flowchart showing the other part of the operation of FIG. 1 embodiment.
Figure 18:
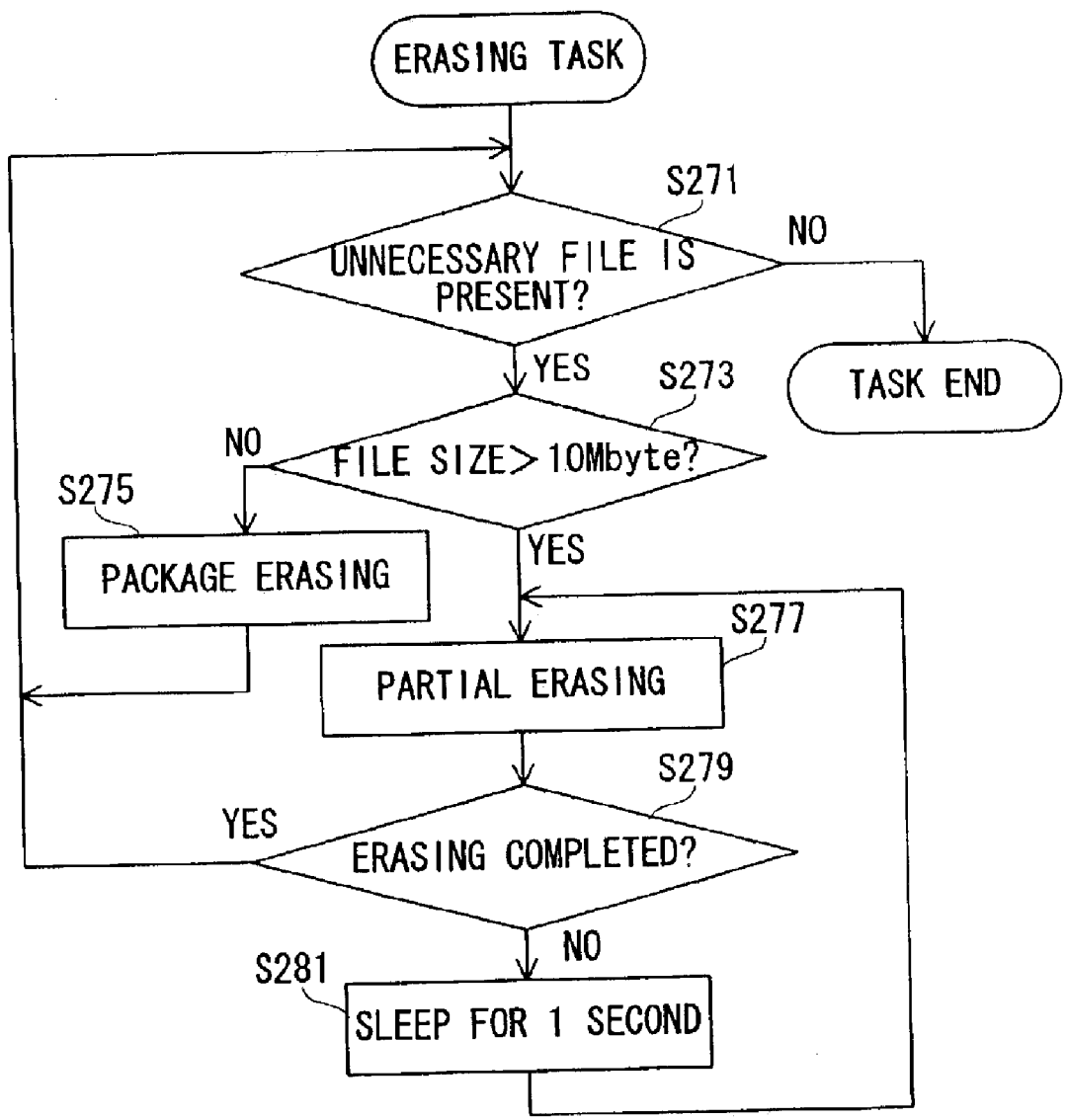
FIG. 18 is a flowchart showing a further part of the operation of FIG. 1 embodiment.

The second erasure estimating process in the step S231 complies with a subroutine shown in FIG. 16 and FIG. 17. First, it is determined whether or not the setting value of the remaining amount register rgst is equal to or more than the first threshold value (="temporary recording time period"+ 15 minutes) in a step S241. If "YES", the process is directly restored to the upper hierarchical level of the routine while if "NO", the process proceeds to a step S243 so as to change the normal MPEG file to the unnecessary MPEG file. It is noted that when the normal recording is started, "temporary recording time period" is set to 0 and the first threshold value becomes 15 minutes.

First, it is determined whether or not the file list is being displayed in the OSD manner in the step S243. Then, if "NO", a key lock flag f1 is reset in a step S245 and then, the process proceeds to a step S249 while if "YES", the key lock flag f1 is set in a step S247 and then, the process proceeds to the step S249. Such the setting/resetting of the key lock flag f1 changes a determination result of the step S39 shown in FIG. 5.

Displaying the text message of "ERASE" is instructed to the MPEG video decoder 40 in the step S249. Thus, erasing of the normal MPEG file is guided through the monitor screen of the television receiver 50. It is determined whether or not the oldest erasable normal MPEG file is searched in a step S251, and it is determined whether or not the MPEG file is specified in a step S253. When specified, the process proceeds to a step S255, and when not specified, the process is restored to the upper hierarchical level of the routine.

The filename of the specified normal MPEG file is erased from the file list in the step S255, and the filename of the specified normal MPEG file recorded in the file management area 32m is changed from "SAN * * * * .mpg" to "del * * * * .mpg" in a step S257. In the step S259, a size of the renamed MPEG file is divided by 2.0 Mbps, and the divided value is subtracted from the setting value of the remaining amount register rgst.

It is determined whether or not the file list is being displayed in the OSD manner in a step S261. Then, if "YES", the key lock flag f1 is set in a step S263 while if "NO", the key lock flag f1 is reset in a step S265. It is determined whether or not a current operation state is in the recording state in a step S267, and it is determined whether or not the setting value of the remaining amount register rgst is equal to or more than the second threshold value ("temporary recording time period"+30 mintues) in the step S269. When the normal recording is started, "temporary recording time period" is set to 0 and therefore, the second threshold value is made 30 minutes.

Where the operation state is in the recording state and the setting value of the remaining amount register rgst is less than 30 mintues, the process in the step S251 and the subsequent is repeated. On the contrary thereto, where the current operation state is in the recording stopped state or the setting value of the remaining amount register rgst is equal to or more than the second threshold value, the process is restored to the upper hierarchical level of the routine.

The erasing task complies with a subroutine shown in FIG. 18. First, it is determined whether or not the unnecessary MPEG file having the filename of "del * * * * . mpg" exists in the normal recording area 32f in a step S271, and if "NO", the erasing task is completed. On the other hand, if the unnecessary MPEG file exists, it is determined whether or not the size of the unnecessary MPEG file is more than 10 Mbytes in a step S273. Then, if the file size is equal to or less than 10 Mbyte, the unnecessary MPEG file is erased by one operation in a step S275 and then, the process is returned to the step S271.

On the contrary thereto, if the file size is more than 10 Mbytes, the unnecessary MPEG file is erased by 10 Mbytes in a step S277, and the process proceeds to a step S279. It is determined whether or not the erasing of the unnecessary MPEG file has been completed in the step S279, and if "YES", the process is returned to the step S271 while if "NO", a sleep process is performed for 1 second in a step S281, and then, the process returns to the step S277. Accordingly, the unnecessary MPEG file exceeding 10 Mbytes is intermittently erased every 10 Mbytes.

It is noted that the process in the step S275 or the step S277 is specifically a process for erasing the filename and the address information written to the file management area 32m in the hard disk 32.

Figure 19:
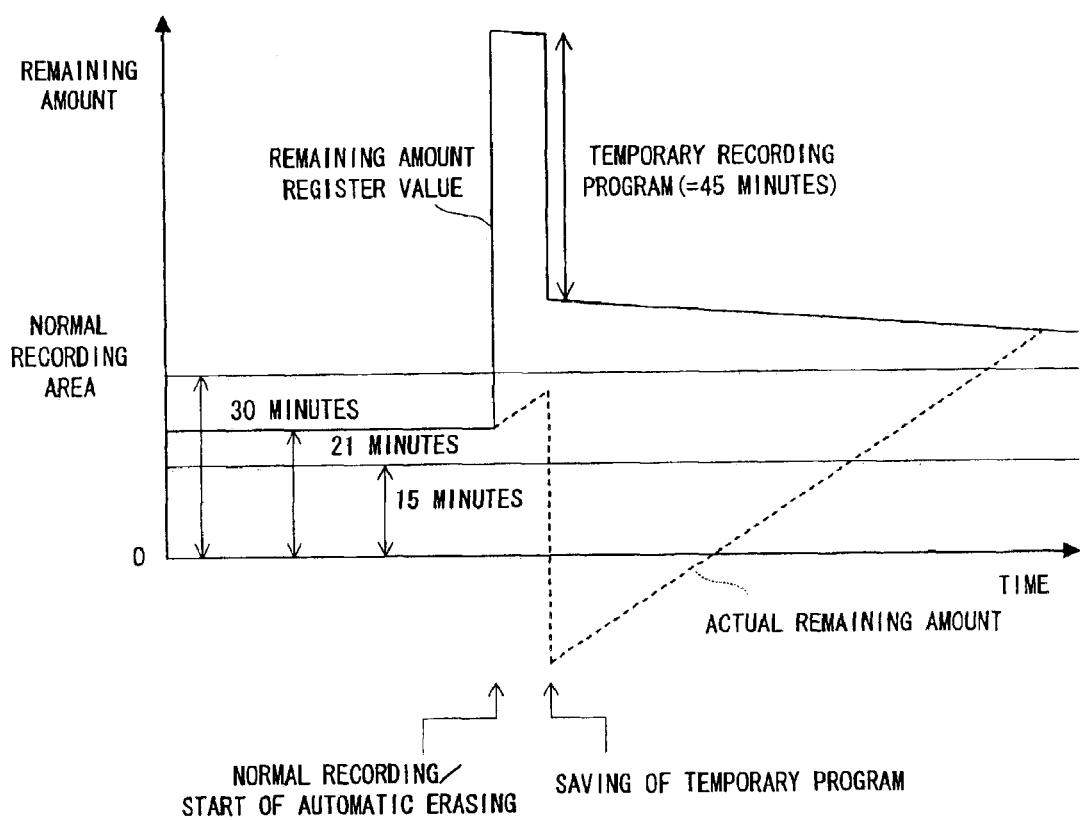
FIG. 19 is an illustrative view showing a part of the operation of FIG. 1 embodiment.

Referring to FIG. 19, where a power is turned on in a state that the actual remaining amount corresponding to 21 minutes is retained in the normal recording area 32f and the recording start event for the normal recording is performed at a time the temporary recording time period elapses 45 minutes, the remaining amount of the normal recording area 32f (=actual remaining amount size/2.0 Mbps) varies with the passage of time in a manner shown by a dotted line, and the setting value of the remaining amount register rgst varies with the passage of time in a manner shown by a solid line.

Since the normal recording area 32f merely having a remaining amount corresponding to only 21 minutes cannot be recorded with a temporary recording program (temporary MPEG file), the automatic erasing is started in response to the recording start event (S107, S111 and S271 to S281). Thereupon, the setting value of the remaining amount register rgist is sharply increased by the first automatic erasure estimating process (S157, S171). Furthermore, since the partial erasing of the unnecessary MPEG file by the erasing task (S277) is performed in parallel with the normal recording, and erasing is faster than recording, an actual remaining amount of the normal recording area 32f is gradually increased.

When the saving operation of the temporary MPEG file is performed (S135), the setting value of the remaining amount register rgist is decreased by the size of the temporary MPEG file (S137). The actual remaining amount of the normal recording area 32f is also decreased by the saving process of the temporary MPEG file (file renaming). It is noted that since a sufficient remaining amount is not retained in the normal recording area 32 at this time, an actual remaining amount value becomes minus. More specifically, a part of the remaining amount in the temporary recording area 32t is assigned for the normal recording.

After the saving process of the temporary MPEG file also, the partial erasing of the unnecessary MPEG file is continued, and the normal recording and the partial erasing are executed in parallel with each other. Then, when the unnecessary MPEG file is completely erased and the erasing task is in the off state, the remaining amount of the normal recording area 32f is set in the remaining amount register rgst (S221).

Figure 20:
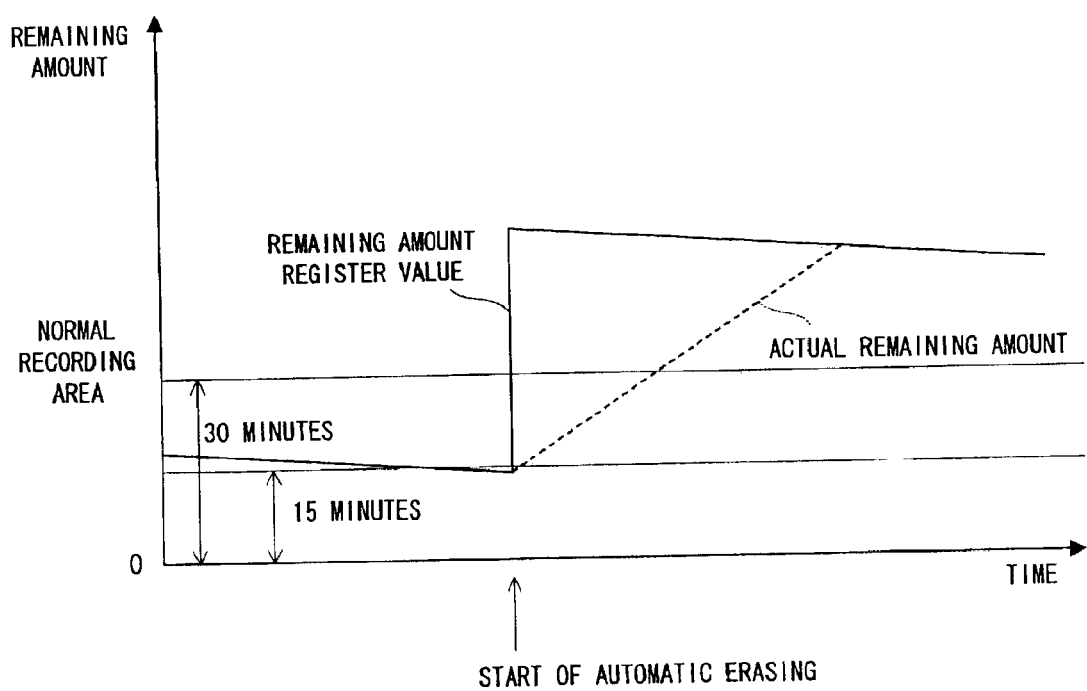
FIG. 20 is an illustrative view showing another part of the operation of FIG. 1 embodiment.

Referring to FIG. 20, if the remaining amount of the normal recording area 32f is lower than 15 minutes by the continuous normal recording, the automatic erasing is executed again (S277 and S231). The setting value of the remaining amount register rgst is sharply increased by the second automatic erasure estimating process (S259). Furthermore, the partial erasing of the unnecessary MPEG file by the erasing task (S277) is performed in parallel with the normal recording, and the actual remaining amount of the normal recording area 32f is gradually increased.

Figure 14:
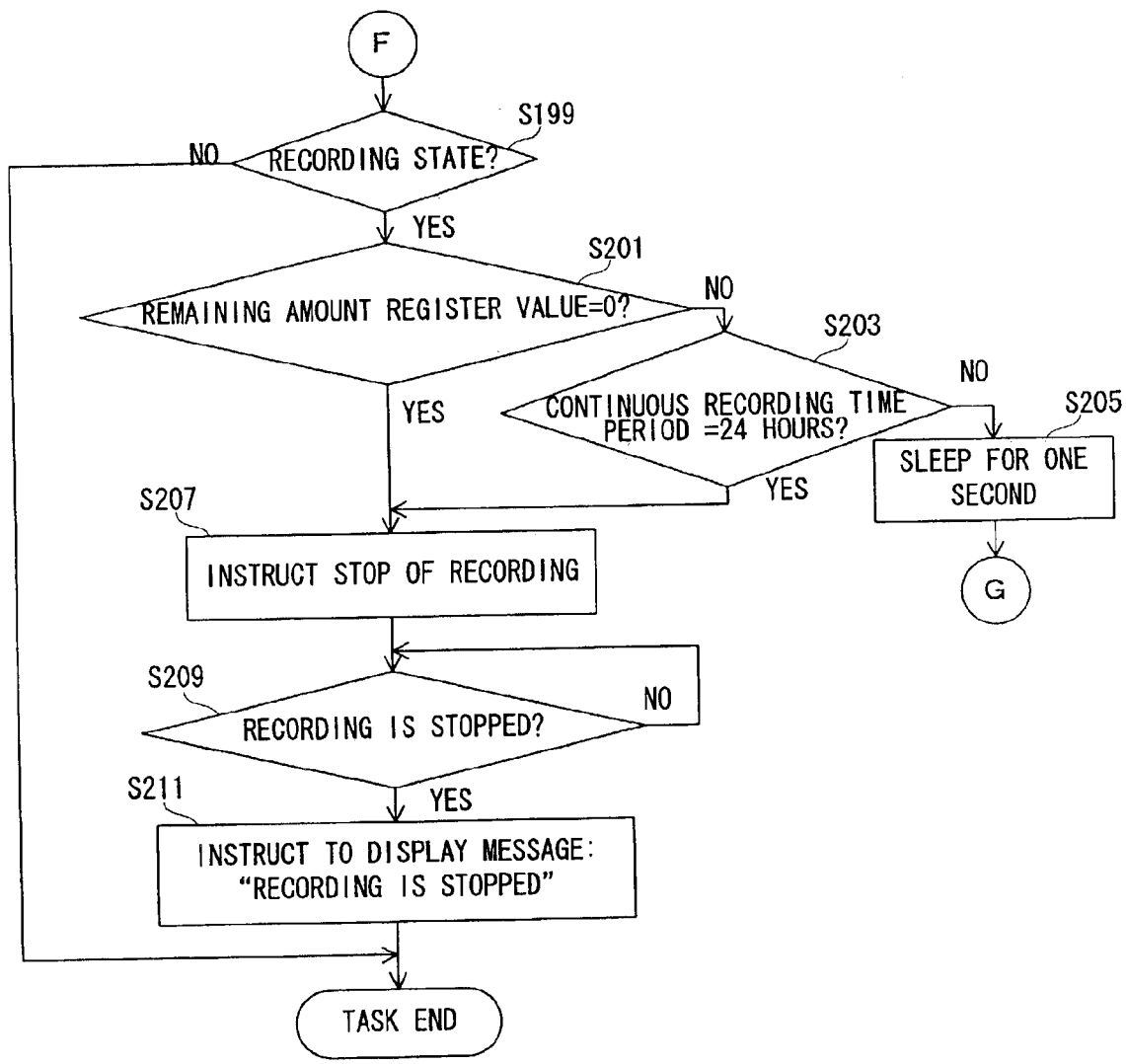
FIG. 14 is a flowchart showing the other part of the operation of FIG. 1 embodiment.
Figure 15:
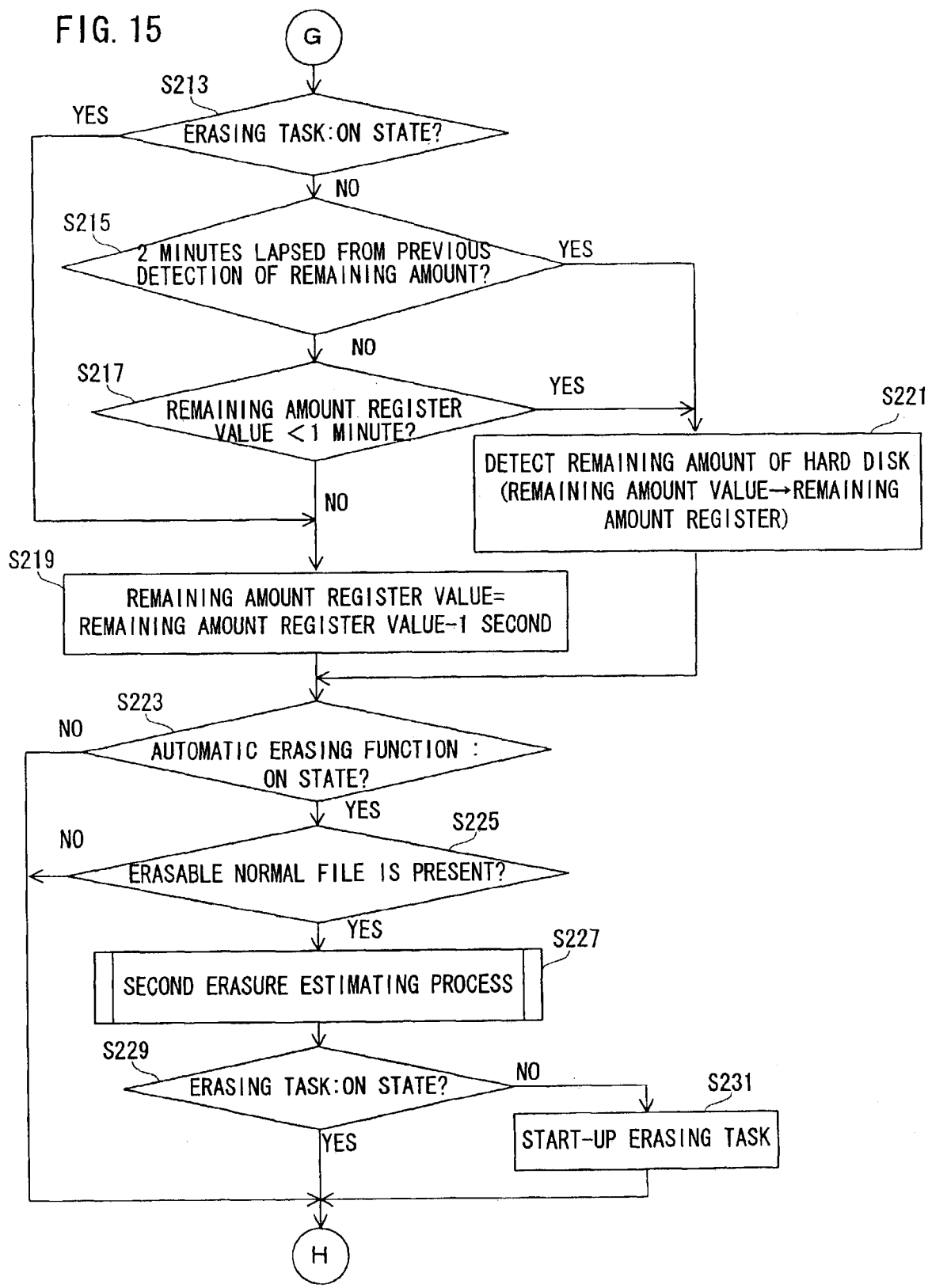
FIG. 15 is a flowchart showing a further part of the operation FIG. 1 embodiment.

According to the remaining amount renewal task shown in FIG. 13 to FIG. 15, the actual remaining amount of the normal recording area 32f is never detected when the erasing task is in the on state, and the setting value of the remaining amount register rgst is subtracted every 1 second irrespective of the actual remaining amount (S213 and S219). On the other hand, when the erasing task is in the off state, the actual remaining amount of the normal recording area 32f is intermittently detected (S213 to S221), and the remaining amount calculated based on the actual remaining amount is set to the remaining amount register rgst (S221). Such the setting value of the remaining amount register rgst is displayed on the monitor screen of the television receiver 50.

As can be understood from the above description, the unnecessary MPEG file recorded in the hard disk 32 is intermittently erased part by part in parallel with the normal recording process. Therefore, it is possible to execute the normal recording process and the erasing process in parallel with each other without overloading the erasing process. In addition, prior to the start of erasing the unnecessary MPEG file, the time length data relating to the actual remaining amount of the hard disk 32 and the total amount of the unnecessary MPEG file is set in the remaining amount register rgst, and the setting value is periodically subtracted. Furthermore, after completion of the erasing process, the actual remaining amount of the hard disk 32 is detected, and the time length data relating to the actual remaining amount is set in the remaining amount register rgst. Therefore, the setting value of the register, i.e., a display of the remaining amount is changed in a manner the operator expects and therefore, the operator is not confused with the partial erasure.

It is noted that although a combined content including a video and a sound such as a television broadcasting program are assumed as a recording content or an erasing content in this embodiment, the content may be either the video or the sound. In addition, although a hard disk is assumed as a recording medium in this embodiment, a magneto optical disk or a semiconductor memory can be utilized in place of this, and the recording medium may be detachable.

It is noted that although a reference transmission speed is 2.0 Mbps in this embodiment, a recording mode having the reference transmission speed of 2.0 Mbps is defined as a low image quality mode, and in addition thereto, a standard image quality mode having the reference transmission speed of 4.0 Mbps or a high image quality mode having the reference transmission speed of 8.0 Mbps may be prepared.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A content recording/erasing apparatus which intermittently erases an unnecessary content from a recording medium part by part in parallel with recording a desired content into said recording medium, comprising:
   a first setter for setting in a register a numeral relating to a total amount of a remaining amount of said recording medium and an amount of said unnecessary content prior to a start of erasing said unnecessary content; and
   a subtracter for periodically subtracting the numeral set in said register.

2. A content recording/erasing apparatus according to claim 1, further comprising:
   a detector for detecting a remaining amount of said recording medium when erasing of said unnecessary content is completed; and
   a second setter for setting in said register a numeral relating to the remaining amount detected by said detector.

3. A content recording/erasing apparatus according to claim 2, wherein said detector performs a detection of the remaining amount in a cycle longer than a subtraction cycle by said subtracter.

4. A content recording/erasing apparatus according to claim 1, further comprising:
   a guide for guiding a start of erasing prior to an actual start of erasing said unnecessary content; and
   a remaining amount displayer for performing a remaining amount display operation based on the numeral set in said register.

5. A content recording/erasing method which intermittently erases unnecessary content from a recording medium part by part in parallel with recording a desired content into said recording medium, comprising steps of:
   (a) setting in a register a numeral relating to a total amount of a remaining amount of said recording medium and an amount of said unnecessary content prior to a start of erasing said unnecessary content; and
   (b) periodically subtracting the numeral set in said register.

* * * * *